(12) United States Patent
Ohira et al.

(10) Patent No.: US 8,553,299 B2
(45) Date of Patent: Oct. 8, 2013

(54) COLOR MATERIAL USAGE ESTIMATING IMAGE PROCESSING APPARATUS, IMAGE FORMING APPARATUS, IMAGE PROCESSING METHOD, AND COMPUTER-READABLE RECORDING MEDIUM ON WHICH IMAGE PROCESSING PROGRAM IS RECORDED

(75) Inventors: Masakazu Ohira, Osaka (JP); Yasutaka Hirayama, Osaka (JP); Takafumi Hosogi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 428 days.

(21) Appl. No.: 12/916,058

(22) Filed: Oct. 29, 2010

(65) Prior Publication Data

US 2011/0102867 A1 May 5, 2011

(30) Foreign Application Priority Data

Oct. 30, 2009 (JP) ................................ P2009-251483

(51) Int. Cl.
*H04N 1/46* (2006.01)
(52) U.S. Cl.
USPC .......... 358/504; 358/1.9; 358/1.13; 382/163; 715/275
(58) Field of Classification Search
USPC ........... 358/1.9, 1.13, 504; 382/163; 715/273, 715/274, 275
See application file for complete search history.

(56) References Cited

U.S. PATENT DOCUMENTS

| 6,559,975 B1 * | 5/2003 | Tolmer et al. ................. 358/1.9 |
| 2005/0168765 A1 | 8/2005 | Akune et al. |
| 2007/0039504 A1 * | 2/2007 | Edwards et al. ............. 101/484 |
| 2008/0246982 A1 | 10/2008 | Kaneko et al. |
| 2009/0147313 A1 | 6/2009 | Miyagi et al. |

FOREIGN PATENT DOCUMENTS

| CN | 101269582 A | 9/2008 |
| CN | 101453547 A | 6/2009 |
| EP | 1 560 151 | 8/2005 |
| JP | 2005-215976 | 8/2005 |
| JP | 2006-270222 A | 10/2006 |

* cited by examiner

*Primary Examiner* — King Poon
*Assistant Examiner* — Jamares Q Washington
(74) *Attorney, Agent, or Firm* — Birch, Stewart, Kolasch & Brich, LLP

(57) ABSTRACT

An image processing apparatus includes a two color process section and a color material usage estimation and calculation section. The two color process section generates, based on input image data of RGB inputted by reading an original document, image data of CMY for outputting a two-color image. The color material usage estimation and calculation section calculates, based on the image data of CMY generated by the two color process section, a usage of color materials used when the two-color image is outputted and generates information concerning the usage of color materials from a result of the calculation. The color material usage estimation and calculation section outputs the generated information concerning the usage of color materials to an image display device.

6 Claims, 21 Drawing Sheets

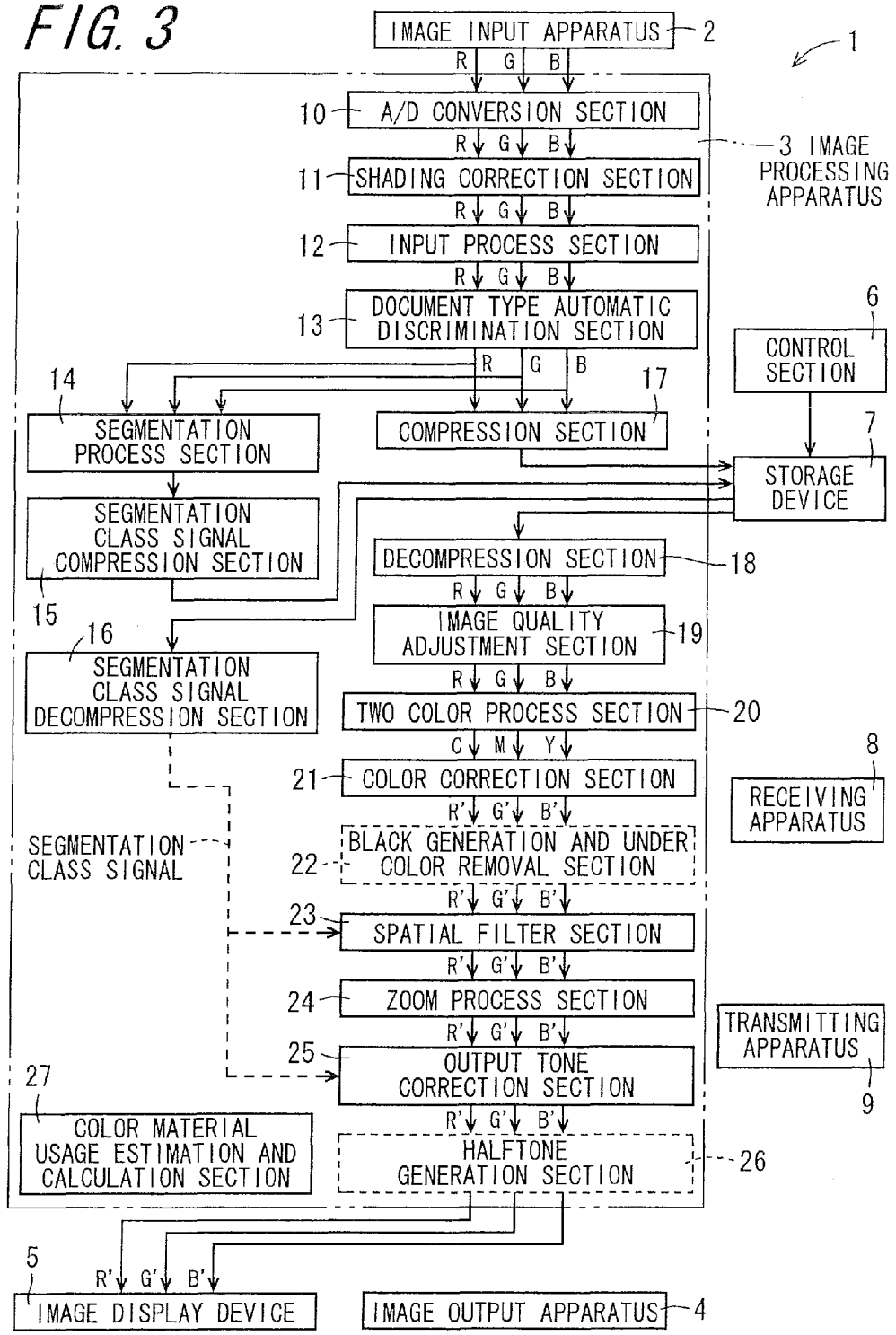

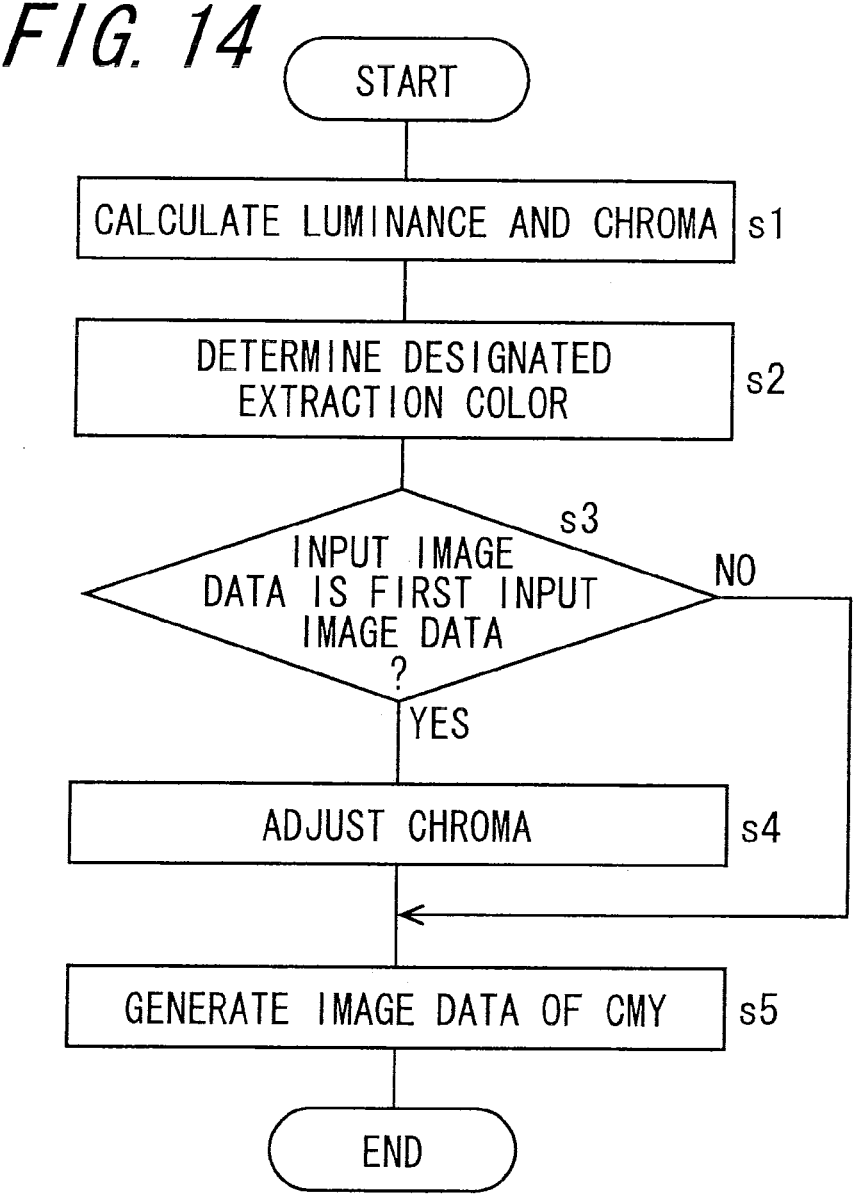

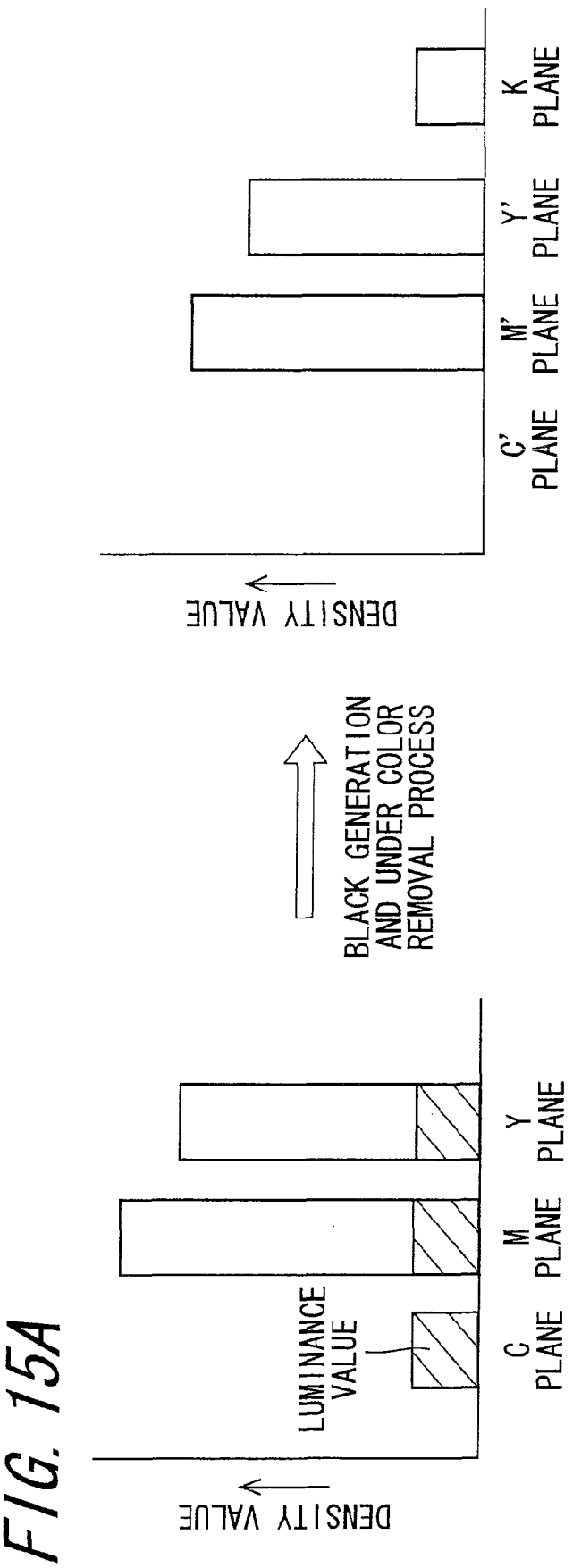

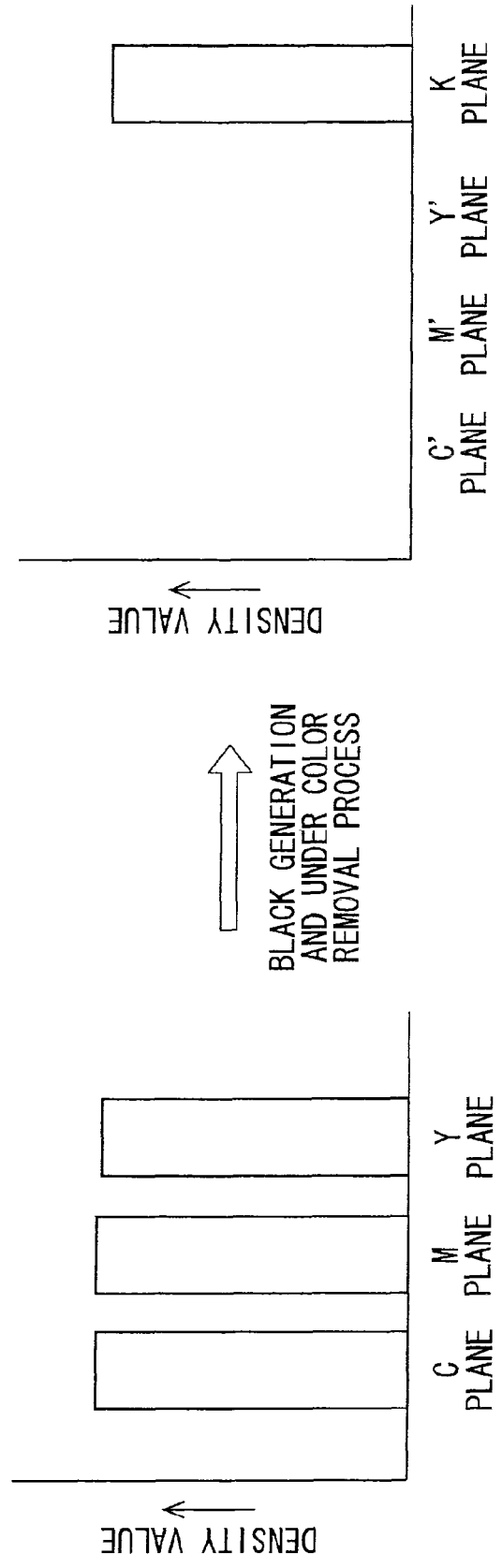

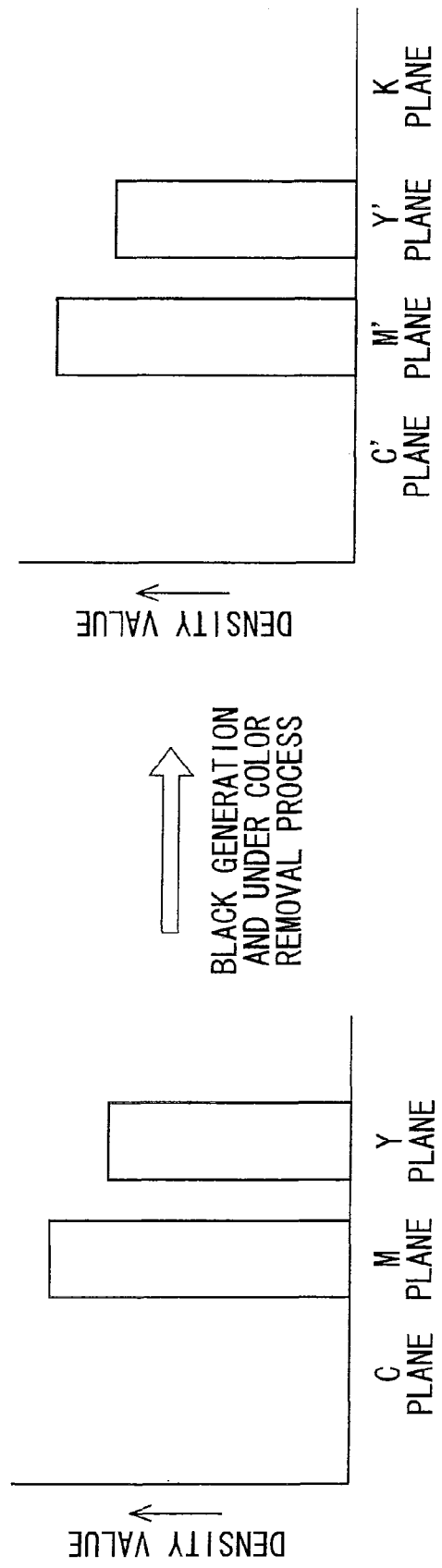

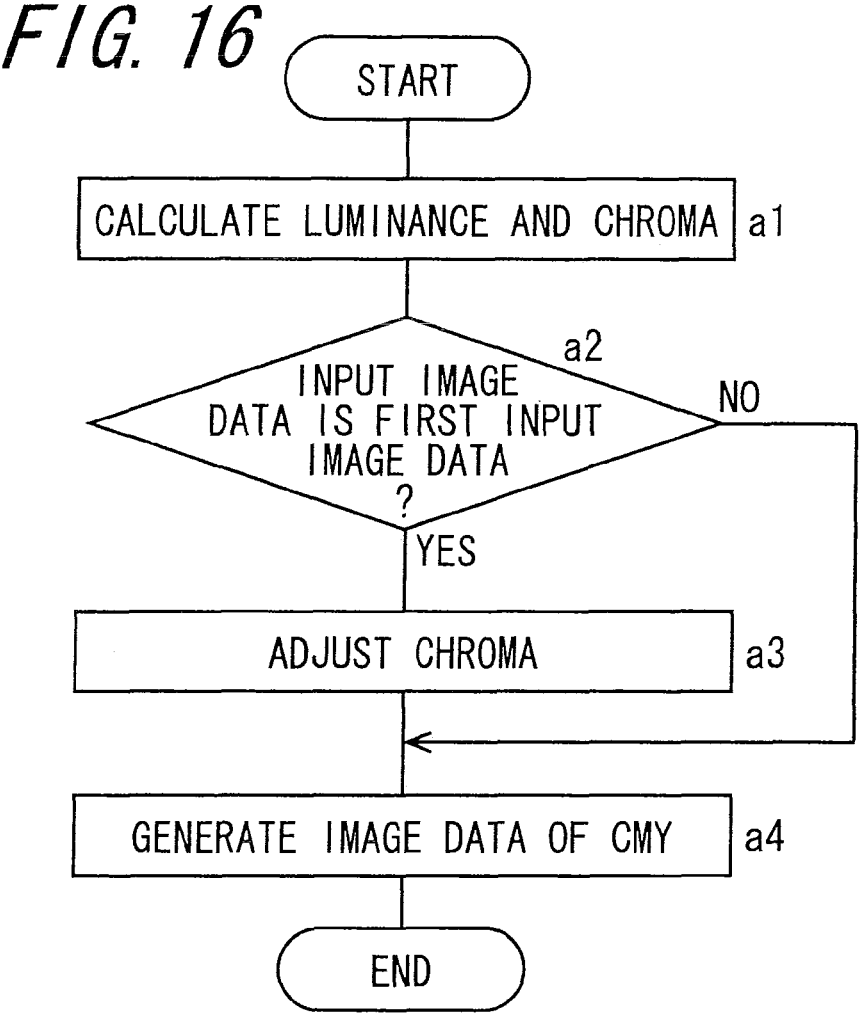

COLOR MATERIAL USAGE ESTIMATING IMAGE PROCESSING APPARATUS, IMAGE FORMING APPARATUS, IMAGE PROCESSING METHOD, AND COMPUTER-READABLE RECORDING MEDIUM ON WHICH IMAGE PROCESSING PROGRAM IS RECORDED

CROSS-REFERENCE TO RELATED APPLICATION

This application claims priority to Japanese Patent Application No. 2009-251483, which was filed on Oct. 30, 2009, the content of which is incorporated herein by reference in its entirety.

BACKGROUND OF THE INVENTION

1. Field of the Invention

The present invention relates to an image processing apparatus which processes an image, an image forming apparatus, an image processing method, and a computer-readable recording medium on which an image processing program is recorded.

2. Description of the Related Art

Among image forming apparatuses such as a digital color copying machine and a multifunction peripheral, some image forming apparatuses have a two-color mode for outputting a two-color image besides a full-color mode for outputting a full-color image and a monochrome mode for outputting a monochrome image.

In the two-color mode, the image forming apparatus outputs all chromatic colors in an original document or a chromatic color (e.g., red), which an operator (user) designates in advance by extracting the chromatic color from the original document, in the chromatic color (e.g., red) designated by the user in advance and outputs portions of other colors in the original document in an achromatic color (black). Consequently, the image forming apparatus can obtain, while reducing a usage of color materials to be smaller than that in the full-color mode, an output image having better color expression than that in the monochrome mode.

In the two-color mode, an image processing apparatus performs a two color process for converting an image of a full-color original document into a two-color image of color composition different from the image. Therefore, it is difficult for the user to surmise whether a two-color image of assumed color composition can be obtained. The user can check, by performing trial printing, color composition of a two-color image to be obtained in the two-color mode. However, as explained above, the two-color mode has a main purpose of reducing a usage of color materials to be smaller than that in the full-color mode. Therefore, it is desirable that the trial printing is unnecessary.

To solve such a problem, Japanese Unexamined Patent Publication JP-A 2006-270222 discloses an image processing apparatus configured to be capable of displaying an image outputted in the two-color mode on an image display device before actually outputting the image. With the image processing apparatus disclosed in JP-A 2006-270222, the user can visually check the image outputted in the two-color mode in the image displayed on the image display device before actually outputting the image.

However, as in the image processing apparatus disclosed in JP-A 2006-270222, in a two color process for converting input image data of RGB (R: red, G: green, G: blue) inputted by reading an original image into image data of CMYK (C: cyan, M: magenta, Y: yellow, K: black) for outputting a two-color image formed of two colors of a chromatic color and an achromatic color, in some case, an amount of color materials used in outputting the two-color image increases to be larger than an amount of color materials used in outputting a full-color image.

For example, in processing for converting input image data of RGB inputted by reading an original document into image data of CMYK for outputting a full-color image, when a two color process for output in red designated by the user is applied to a pixel, density (pixel) values of planes of C, M, Y, and K of which are converted into (C, M, Y, K)=(255, 0, 0, 0), density values of the planes of C, M, Y, and K in image data after the conversion are (C, M, Y, K)=(0, 255, 255, 0).

In this way, whereas color materials equivalent to C=255 are used when the full-color image is outputted, color materials equivalent to 510 as a total of M=255 and Y=255 are used when the two-color image is outputted.

Specifically, in the image processing apparatus disclosed in JP-A 2006-270222, the user can visually check a two-color image in an image displayed on the image display device before actually outputting the two-color image and check whether a desired two color process is applied in terms of image quality. However, the user cannot check whether a desired two color process is applied in terms of a usage of color materials.

SUMMARY OF THE INVENTION

It is an object of the invention to provide an image processing apparatus, an image forming apparatus, an image processing method, and a computer-readable recording medium on which an image processing program is recorded that are configured to be capable of displaying information concerning a usage of color materials on an image display device before outputting a two-color image formed of two colors of a chromatic color and an achromatic color and can support a user in performing work for selecting appropriate image processing in terms of a usage of color materials.

The invention provides an image processing apparatus connected to an image display device capable of displaying an image so as to perform data communication each other, the image processing apparatus comprising:

a two color process section that generates, based on input image data of RGB inputted by reading an original document, image data of CMY for outputting a two-color image formed of two colors of a chromatic color and an achromatic color; and a color material usage estimation and calculation section that calculates, based on the image data of CMY generated by the two color process section, a usage of color materials used in outputting the two-color image and generates information concerning the usage of color materials from a result of the calculation, the color material usage estimation and calculation section outputting the generated information concerning the usage of color materials to the image display device.

According to the invention, the image processing apparatus connected to an image display device capable of displaying an image so as to perform data communication each other includes the two color process section and the color material usage estimation and calculation section. The two color process section generates, based on input image data of RGB inputted by reading an original document, image data of CMY for outputting a two-color image formed of two colors of a chromatic color and an achromatic color. The color material usage estimation and calculation section calculates, based on the image data of CMY generated by the two color process section, a usage of color materials used in outputting the two-color image and generates information concerning the usage of color materials from a result of the calculation. The color material usage estimation and calculation section outputs the generated information concerning the usage of color materials to the image display device. Consequently, the information concerning the usage of color materials is displayed on the image display device.

Therefore, a user can learn, from the information displayed on the image display device, before outputting the two-color image, the usage of color materials used in outputting the two-color image. When the usage of color materials is an undesired value for the user, the user can perform operation for changing a mode. In other words, the image processing apparatus can support the user in performing the work for selecting appropriate image processing in terms of a usage of color materials.

Furthermore, in the invention, it is preferable that the image processing apparatus comprises a color correction section that generates, based on the input image data of RGB, image data of CMY for outputting a full-color image, and the color material usage estimation and calculation section calculates, based on the image data of CMY generated by the color correction section, a first usage that is a usage of color materials used in outputting the full-color image, calculates, based on the image data of CMY generated by the two color process section, a second usage that is a usage of color materials used in outputting the two-color image, and generates, from results of the calculations, as information concerning a usage of color materials, information representing a comparison of the first usage and the second usage.

According to the invention, the image processing apparatus further comprises a color correction section that generates, based on the input image data of RGB, image data of CMY for outputting a full-color image, and the color material usage estimation and calculation section calculates, based on the image data of CMY generated by the color correction section, a first usage that is a usage of color materials used in outputting the full-color image and calculates, based on the image data of CMY generated by the two color process section, a second usage that is a usage of color materials used in outputting the two-color image. The color material usage estimation and calculation section generates, from results of the calculations, as information concerning a usage of color materials, information representing a comparison of the first usage and the second usage.

The information representing the first usage and the second usage generated by the color material usage estimation and calculation section is outputted to the image display device. Therefore, the user can compare, from the information displayed on the image display device, the usage of color materials used in outputting the full-color image and the usage of color materials used in outputting the two-color image. When, even if the two-color image is outputted, an effect of reduction of a usage of color materials is smaller than that in the case of the output of the full-color image, the user can perform operation for changing a mode.

Furthermore, in the invention, it is preferable that the color material usage estimation and calculation section generates, as information concerning a usage of color materials, information representing a color-material-usage ratio that is a ratio of the second usage to the first usage and outputs, when the color-material-usage ratio is equal to or larger than a predetermined threshold, the generated information representing the color-material-usage ratio to the image display device.

According to the invention, the color material usage estimation and calculation section generates, as information concerning a usage of color materials, information representing a color-material-usage ratio that is a ratio of the second usage to the first usage and outputs, when the color-material-usage ratio is equal to or larger than a predetermined threshold, the generated information representing the color-material-usage ratio to the image display device.

Consequently, when, even if the two-color image is outputted, an effect of reduction of a usage of color materials is smaller than that in the case of the output of the full-color image, the user can output the information representing the color-material-usage ratio to the image display device.

Furthermore, in the invention, it is preferable that the image processing apparatus comprises a preview image data generation section that generates, based on the input image data of RGB, image data for preview representing the two-color image, and the preview image data generation section outputs the generated image data for preview to the image display device.

According to the invention, the image processing apparatus further comprises a preview image data generation section that generates, based on the input image data of RGB, image data for preview representing the two-color image, and the preview image data generation section outputs the generated image data for preview to the image display device.

This makes it possible to cause the image display device to display the information representing the comparison of the first usage and the second usage and the generated image data for preview. Therefore, the user can also check, from the information displayed on the image display device, together with a usage of color materials, an image in outputting the two-color image. Therefore, the image processing apparatus can more appropriately support the user in performing the work for selecting appropriate image processing.

Further, the invention provides an image forming apparatus comprising the image processing apparatus mentioned above.

According to the invention, the image forming apparatus comprises the image processing apparatus mentioned above. Consequently, the image forming apparatus can support the user in performing the work for selecting appropriate image processing in terms of a usage of color materials.

The invention provides an image processing method executed in an image processing apparatus connected to an image display device capable of displaying an image so as to perform data communication each other, the image processing method comprising:

a two color process step of generating, based on input image data of RGB inputted by reading an original document, image data of CMY for outputting a two-color image formed of two colors of a chromatic color and an achromatic color; and a color material usage estimation and calculation step of calculating, based on the image data of CMY generated in the two color process step, a usage of color materials used in outputting the two-color image and generating information concerning the usage of color materials from a result of the calculation, the color-material-usage estimation and calculation step including outputting the generated information concerning the usage of color materials to the image display device.

According to the invention, the image processing method executed in an image processing apparatus connected to an image display device capable of displaying an image so as to perform data communication each other includes the two color process step and the color material usage estimation and calculation step. In the two color process step, image data of CMY for outputting a two-color image formed of two colors of a chromatic color and an achromatic color is generated based on input image data of RGB inputted by reading an original document. In the color material usage estimation and calculation step, a usage of color materials used in outputting the two-color image is calculated based on the image data of CMY generated in the two color process step, information concerning the usage of color materials is generated from a result of the calculation, and the generated information concerning the usage of color materials is outputted to the image display device. Through these steps, the information concerning the usage of color materials is displayed on the image display device.

Therefore, a user can learn, from the image displayed on the image display device, before outputting the two-color image, the usage of color materials used in outputting the two-color image. When the usage of color materials is an undesired value for the user, the user can perform operation for changing a mode. In other words, the image processing method can support the user in performing the work for selecting appropriate image processing in terms of a usage of color materials.

Furthermore, in the invention, it is preferable that the image processing method comprises a color correction step of generating, based on the input image data of RGB, image data of CMY for outputting a full-color image, and the color material usage estimation and calculation step includes calculating, based on the image data of CMY generated in the color correction step, a first usage that is a usage of color materials used in outputting the full-color image, calculating, based on the image data of CMY generated in the two color process step, a second usage that is a usage of color materials used in outputting the two-color image, and generating, from results of the calculations, as information concerning a usage of color materials, information representing a comparison of the first usage and the second usage.

According to the invention, the image processing method further comprises a color correction step of generating, based on the input image data of RGB, image data of CMY for outputting a full-color image. The color material usage estimation and calculation step includes calculating, based on the image data of CMY generated in the color correction step, a first usage that is a usage of color materials used in outputting the full-color image, calculating, based on the image data of CMY generated in the two color process step, a second usage that is a usage of color materials used in outputting the two-color image, and generating, from results of the calculations, as information concerning a usage of color materials, information representing a comparison of the first usage and the second usage.

The information representing the first usage and the second usage generated in the color material usage estimation and calculation step is outputted to the image display device. Therefore, the user can compare, from the information displayed on the image display device, the usage of color materials used in outputting the full-color image and the usage of color materials used in outputting the two-color image. When, even if the two-color image is outputted, an effect of reduction of a usage of color materials is smaller than that in the case of the output of the full-color image, the user can perform operation for changing a mode.

The invention provides a computer-readable recording medium on which is recorded an image processing program for causing a computer to function as the sections of the image processing apparatus mentioned above.

According to the invention, the image processing program is a program for causing a computer to function as the sections of the image processing apparatus. Such an image processing program can control, with software, processing that can support a user in performing the work for selecting appropriate image processing in terms of a usage of color materials.

Further, the recording medium is a computer-readable recording medium on which the image processing program is recorded. Therefore, it is possible to realize the image processing apparatus on the computer according to the program read out from the computer-readable recording medium.

BRIEF DESCRIPTION OF THE DRAWINGS

Other and further objects, features, and advantages of the invention will be more explicit from the following detailed description taken with reference to the drawings wherein:

FIG. 3 is a diagram for explaining processes performed when the image forming apparatus displays a preview;

FIG. 14 is a flowchart for explaining a process procedure of processes executed by the two color process section in a color selection mode;

FIGS. 15A to 15C are diagrams schematically showing density values of the planes of the image data of CMY generated by the two color process section and density values of planes of the image data of C'M'Y'K generated by a black generation and under color removal section;

FIG. 16 is a flowchart for explaining a process procedure of processes executed by the two color process section in a chromatic color extraction mode;

DETAILED DESCRIPTION

Figure 1:
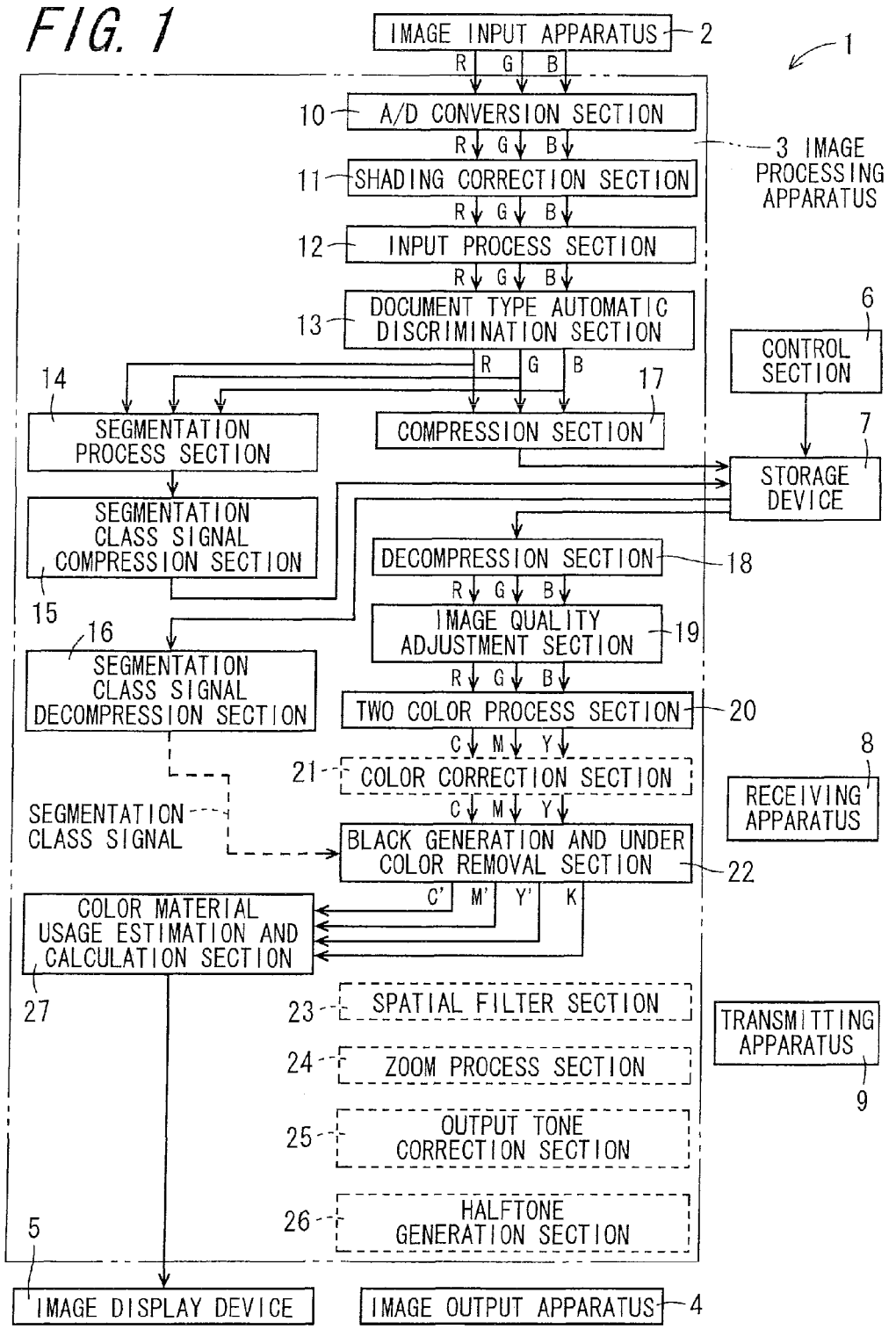
FIG. 1 is a block diagram showing the configuration of an image forming apparatus according to an embodiment of the invention.

Now referring to the drawings, preferred embodiments of the invention are described below.

FIG. 1 is a block diagram showing the configuration of an image forming apparatus 1 according to an embodiment of the invention. FIG. 1 is also a diagram for explaining processes performed when an image processing apparatus 3 causes an image display device 5 to display information concerning a usage of color materials. The image forming apparatus 1 is a digital color multifunction peripheral that executes, when any one mode among a copier mode, a print mode, a facsimile transmission mode, a facsimile reception mode, and an image sending mode is selected, the selected mode.

The copier mode (a copying mode) is a mode for reading image data (reading an original document and generating image data) and printing an image of the image data on a sheet. The print mode is a mode for printing an image of image data transmitted from a terminal apparatus connected to the image forming apparatus 1 on a sheet. The facsimile transmission mode includes a normal facsimile mode for transmitting image data obtained by reading an original document to an external apparatus through a telephone line and an Internet facsimile mode for transmitting the image data via the Internet with the image data attached to an electronic mail. The facsimile reception mode is a mode for receiving image data from the external apparatus by facsimile and printing an image of the received image data on a sheet. The image sending mode includes (1) a mode for transmitting image data generated by reading an original document to a designated address with the image data attached to an electronic mail (a scan to e-mail mode), (2) a mode for transmitting image data generated by reading an original document to a folder designated by an operator (a user) (a scan to ftp mode), and (3) a mode for transmitting image data generated by reading an original document to a USB memory or the like inserted in the image forming apparatus 1 (a scan to usb mode).

The image forming apparatus 1 executes, when the operator (the user) designates the copier mode or the print mode from an operation panel or the like, based on the designation by the user, operation of any one of a monochrome mode for outputting a monochrome image, a full-color mode for outputting a full-color image, a single color mode for outputting a single-color image formed of only one color desired by the user, and a two-color mode for outputting a two-color image formed of one chromatic color desired by the user and an achromatic color (black).

In the copier mode or the print mode, the image forming apparatus 1 outputs, when the single-color mode is designated from the operation panel or the like, a single-color image and outputs, when the two-color mode is designated, a two-color image. In the single-color mode, the image forming apparatus 1 outputs, when a desired one color is designated out of R (red), G (green), B (blue), C (cyan), M (magenta), and Y (yellow) from the operation panel or the like, a single-color image formed of only the designated one color.

In the two-color mode, the image forming apparatus 1 executes operation of a chromatic color extraction mode or a color selection mode based on designation by the user from the operation panel or the like. The image forming apparatus 1 extracts, when the chromatic color extraction mode is designated from the operation panel or the like, all chromatic colors in an original document, outputs all the chromatic colors in a chromatic color designated by the user in advance (a designated output color), and outputs other color portions in the original document in an achromatic color (black). The image forming apparatus 1 extracts, when the color selection mode is designated from the operation panel or the like, a chromatic color designated by the user in advance (a designated extraction color) from the original document, outputs color belonged to the designated extraction color in a chromatic color designated by the user in advance (a designated output color), and outputs other color portions in the original document in the achromatic color (black). In the image forming apparatus 1, as each of the designated extraction color and the designated output color, desired one color is designated out of R (red), G (green), B (blue), C (cyan), M (magenta), and Y (yellow) from the operation panel or the like.

In this embodiment, in the copier mode, the image forming apparatus 1 can set an automatic discrimination mode. When the automatic discrimination mode is set, the image forming apparatus 1 performs an automatic color selection process (ACS) for determining whether a copying target is a color original document or a monochrome original document. When the copying target is discriminated as a color original document, the image forming apparatus 1 performs an output process in the full-color mode. When the copying target is discriminated as a monochrome original document, the image forming apparatus 1 performs the output process in the monochrome mode.

The image forming apparatus 1 includes an image input apparatus 2, the image processing apparatus 3 according to the invention, an image output apparatus 4, an image display device 5, a control section 6, a storage device 7, a receiving apparatus 8, and a transmitting apparatus 9.

The image input apparatus 2 is an image reading section capable of inputting color image data in the copier mode, facsimile transmission mode, and the image sending mode. The image input apparatus 2 reads an original document and generates image data. More specifically, the image input apparatus 2 is realized by a scanner including a CCD (Charge Coupled Device) image sensor. The image input apparatus 2 reads, with the CCD image sensor, a reflected light image from an original document as analog signals of RGB (R: red, G: green, B: blue) and outputs analog image data of RGB to the image processing apparatus 3. Even when any one of the full-color mode, the single-color mode, and the two-color mode is selected, the image input apparatus 2 reads an original document image in full-color. Even when the automatic color selection process is performed in the image processing apparatus 3, the image input apparatus 2 reads an original document image in full-color.

As explained in detail later, the image processing apparatus 3 is an integrated circuit that applies image processing to image data (an image signal) inputted from the image input apparatus 2. The image processing apparatus 3 includes an ASIC (Application Specific Integrated Circuit). In the copier mode, the facsimile transmission mode, and the image sending mode, the image processing apparatus 3 applies the image processing to image data inputted from the image input apparatus 2. In the print mode, the image processing apparatus applies the image processing to image data transmitted from a terminal apparatus. In the facsimile reception mode, the image processing apparatus 3 applies the image processing to image data received from an external apparatus. In the copier mode, the print mode, and the facsimile reception mode, the image processing apparatus 3 transmits the image data subjected to the image processing to the image output apparatus 4. In the facsimile transmission mode, the image processing apparatus 3 transmits the image data subjected to the image processing to the transmitting apparatus 9. In the "scan to e-mail" mode of the image sending mode, the image processing apparatus 3 transmits the image data subjected to the image processing to a mail process section (not shown). In the "scan to ftp" mode, the image processing apparatus 3 transmits the image data subjected to the image processing to a predetermined folder. In the "scan to usb" mode, the image processing apparatus 3 transmits the image data subjected to the image processing to a predetermined USB memory.

The image output apparatus 4 is realized by a printer of an electrophotographic system, an ink-jet system, or the like. The image output apparatus 4 prints (forms) an output image on a recording material (e.g., a recording sheet) based on the image data subjected to the image processing by the image processing apparatus 3. In this embodiment, "printing" means any one of printing in the print mode, printing in the copier mode, and printing in the facsimile reception mode.

The image display device 5 is a liquid crystal display included in the operation panel (not shown) of the image forming apparatus 1 and is a display section capable of displaying a color image. The image display device 5 is covered with a touch panel and has a function of an input interface of the image forming apparatus 1. Specifically, a GUI (graphical user interface) or an operation guide for inputting various commands to the image forming apparatus 1 is displayed on the image display device 5.

In the copier mode or the facsimile reception mode, the image forming apparatus 1 according to this embodiment can display a preview of a printing target image on the image display device 5 before executing printing. In the facsimile transmission mode or the image sending mode, the image forming apparatus 1 according to this embodiment can display a preview of a transmission target image on the image display device 5 before executing transmission. In the copier mode or the image sending mode, when the full-color mode is selected, the image forming apparatus 1 displays a preview of a full-color image on the image display device 5. When the single-color mode is selected, the image forming apparatus 1 displays a preview of a single-color image on the image display device 5. When the two-color mode is selected, the image forming apparatus 1 displays a preview of a two-color image on the image display device 5. The image display device is not limited to the liquid crystal display and may be a display section other than the liquid crystal display (e.g., an organic EL display or a plasma display).

The receiving apparatus 8 is an apparatus that is connected to a telephone line or the Internet and receives image data from an external apparatus through facsimile communication. The transmitting apparatus 9 is an apparatus that is connected to the telephone line or the Internet and transmits image data inputted by the image input apparatus 2 to an external apparatus through facsimile transmission.

The storage device 7 is a hard disk drive for temporarily storing image data treated in the image processing apparatus 3. The control section 6 is a computer including a processor such as a CPU (Central Processing Unit) or a DSP (Digital Signal Processor). The control section 6 collectively controls various kinds of hardware included in the image forming apparatus 1. The control section 6 also has a function of controlling data transfer among the kinds of hardware included in the image forming apparatus 1.

The image processing apparatus 3 according to the invention includes blocks of an A/D (analog/digital) conversion section 10, a shading correction section 11, an input process section 12, a document type automatic discrimination section 13, a segmentation process section 14, a compression section 17, a segmentation class signal compression section 15, a decompression section 18, a segmentation class signal decompression section 16, an image quality adjustment section 19, a two color process section 20, a color correction section 21, a black generation and under color removal section 22, a spatial filter section 23, a zoom process section 24, an output tone correction section 25, a halftone generation section 26, and a color material usage estimation and calculation section 27.

In the image forming apparatus 1, the two-color mode is a mode capable of obtaining an output image having better color expression than that in the monochrome mode while reducing a usage of color materials to be smaller than that in the full-color mode. However, depending on color composition of an original document, when a two-color image is outputted in the two-color mode, in some case, a usage of color materials increases to be larger than that in outputting a full-color image in the full-color mode. Therefore, the image processing apparatus 3 according to this embodiment can display information concerning a usage of color materials on the image display device 5 before the image output apparatus 4 outputs a two-color image. The image processing apparatus 3 can support the user for selecting appropriate image processing in terms of a usage of color materials.

Contents of processing executed in the blocks of the image processing apparatus 3 in the copier mode, the facsimile transmission mode, the facsimile reception mode, and the image sending mode are explained in detail below. In the image processing apparatus 3 according to this embodiment, there are blocks that operate when a certain mode "a" is selected and do not operate when a mode "b" different from the mode "a" is selected. The mode "a" and the mode "b" are any ones of the copier mode, the facsimile transmission mode, the facsimile reception mode, and the image sending mode. In the image processing apparatus 3, there are also blocks that change process contents according to a selected mode (the full-color mode, the single-color mode, or the two-color mode). Further, there are blocks that operate during a process of image data for printing (for transmission) outputted to the image output apparatus 4 and do not operate during a process of information outputted to the image display device 5 even if a selected mode (the full-color mode, the single-color mode, or the two-color mode) is the same and blocks that change process contents during the process of the information outputted to the image display device 5 and during the process of the image data for printing (for transmission) outputted to the image output apparatus 4. Therefore, in the following explanation, process contents executed in the blocks included in the image processing apparatus 3 are explained for each of the modes. The process contents during the process of the information outputted to the image display device 5 and during the print process (or during the transmission process) are separately explained.

The image processing apparatus 3 executes, as a process for generating information outputted to the image display device 5, in the two-color mode, a process for generating information concerning a usage of color materials and a process for generating image data for preview and executes, in the full-color mode and the single-color mode, a process for generating image data for preview.

(1) Image Processing Operations in the Two-Color Mode (1-1) Image Processing Operations for Generating Information that the Image Processing Apparatus 3 Causes the Image Display Device 5 to Display Display process operations of the image processing apparatus 3 for generating, before the image output apparatus 4 outputs a two-color image, information that the image processing apparatus 3 causes the image display device 5 to display include a first display process operation for separately generating information concerning a usage of color materials and image data for preview, a second display process operation for generating only the information concerning a usage of color materials, and a third display operation for generating information concerning the usage of color materials simultaneously with the image data for preview.

(a) First Display Process Operation in the Image Processing Apparatus 3

A process for generating information concerning a usage of color materials in the first display process operation executed by the image processing apparatus 3 when the copier mode and the two-color mode are designate is explained with reference to FIG. 1.

The A/D conversion section 10 converts analog image data of RGB (R: red, G: green, B: blue) inputted from the image input apparatus 2 into digital image data (RGB digital signals) and sends the digital image data to the shading correction section 11. The shading correction section 11 applies a process for removing distortion, which occurs in an illuminating system, a focusing system, and an imaging system of the image input apparatus 2, to the digital RGB image data sent from the A/D conversion section 10. The input process section 12 applies a tone conversion process such as a γ correction process to each of the image data of RGB sent from the shading correction section 11.

The document type automatic discrimination section 13 performs, based on the image data of RGB (density signals of RGB) subjected to the tone conversion process such as γ correction by the input process section 12, determination of a type of an original document read by the image input apparatus 2. As the type of the original document to be determined, there are a text document, a printed-picture document, a text and printed-picture document in which a text and a printed-picture are mixed, and the like. The document type automatic discrimination section 13 can also perform, based on the image data, automatic color selection process (ACS: Auto Color Selection), which is a process for discriminating whether a read original document is a color original document or a monochrome original document, and a process for determining whether the document is a blank page document (an empty document). The image data of RGB outputted from the document type automatic discrimination section 13 is inputted to the segmentation process section 14 and the compression section 17.

The segmentation process section 14 performs, based on the image data of RGB sent from the document type automatic discrimination section 13, for each of pixels of an input image, discriminating into what kind of image area the pixel is classified and generating a segmentation class signal indicating a result of the discrimination. As the image area discriminated by the segmentation process section 14, there are a black text area, a color text area, a halftone dot area, and the like. The segmentation process section 14 may adopt a form for determining an image area for each of blocks including plural pixels rather than a form for determining an image area for each of the pixels.

The compression section 17 performs a process for encoding the image data of RGB sent from the document type automatic discrimination section 13. The encoding is performed based on, for example, a JPEG (Joint Photographic Experts Group) system.

The segmentation class signal compression section 15 applies a compression process to the segmentation class signal generated for each of the pixels. The compression process in the segmentation class signal compression section 15 is performed based on, for example, an MMR (Modified Modified Reed) system or an MR (Modified Reed) system, which is a lossless compression method.

The control section 6 causes the storage device 7 to temporarily store therein an encoded code (the encoded image data) outputted from the coding section 17 and a segmentation class signal code (the compressed segmentation class signal) outputted from the segmentation class signal coding section 15 and manages the encoded code and the segmentation class signal code as filing data. When a copy output operation is instructed, the control section 6 reads out the encoded code and the segmentation class signal code corresponding to the encoded code from the storage device 7 and passes the encoded code and the segmentation class signal code to the decompression section 18 and the segmentation class signal decompression section 16, respectively.

The control section 6 enters a storage address or a data name of the encoded code and a storage address of the segmentation class signal code in a management table in association with each other. In other words, the control section 6 performs control of readout or writing of the encoded code and the segmentation class signal code using the management table.

The decompression section 18 applies a decoding process to the encoded code to thereby decompress the encoded code into image data of RGB. The segmentation class signal decompression section 16 applies a decoding process to the segmentation class signal code. The segmentation class signal decompression section 16 passes a decoded segmentation class signal to the black generation and under color removal section 22. The black generation and under color removal section 22 performs selecting of image processing content according to a type of an image area.

The image quality adjustment section 19 performs detection of a page background and performs page background removal correction concerning the image data of RGB sent from the decompression section 18. The image quality adjustment section 19 performs, based on setting information inputted from the operation panel (not shown) by the operator (the user), adjustment of balance of RGB (color adjustment and overall color adjustment for a tinge of red and a tinge of blue), brightness, and saturation. Image data outputted from the image quality adjustment section 19 is image data of RGB in the two-color mode.

The image processing method according to the invention is executed by the image processing apparatus 3, the two color process step in the image processing method is executed by the two color process section 20, and the color material usage estimation and calculation step is executed by the color material usage estimation and calculation section 27.

Figure 2:
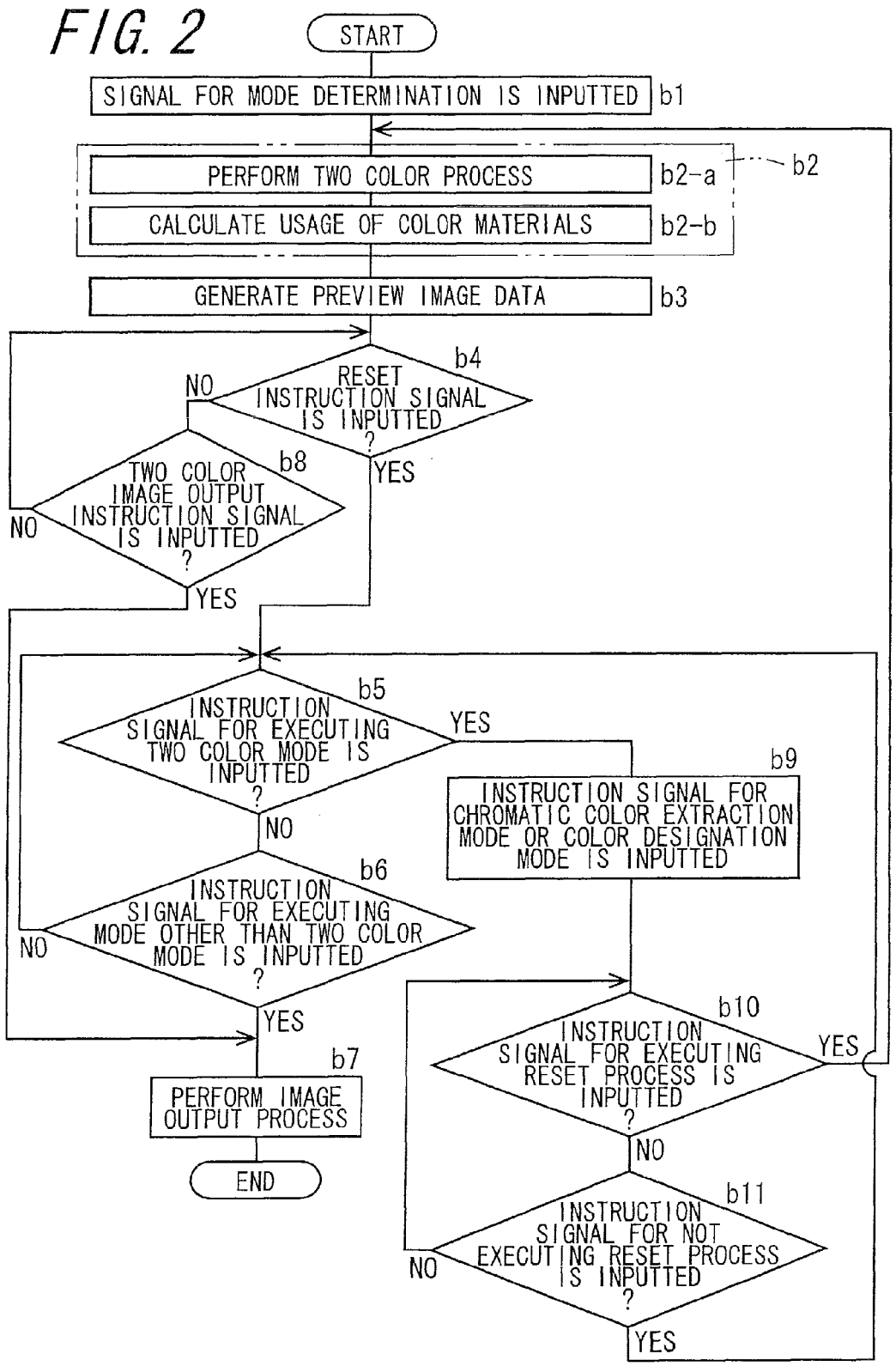
FIG. 2 is a flowchart for explaining a process procedure of a first display process operation in an image processing apparatus.

FIG. 2 is a flowchart for explaining a process procedure of the first display process operation in the image processing apparatus 3.

Step b1 is a mode determination step. In step b1, the image processing apparatus 3 determines, based on an instruction inputted by the user from the operation panel or the like, which one of the chromatic color extraction mode and the color selection mode is selected.

Step b2 is a color material usage information generation step and includes a two color process step of step b2-a and a color material usage estimation and calculation step of step b2-b. In the two color process step of step b2-a, when the two-color mode is selected, the two color process section 20 performs a process for converting the image data of RGB sent from the image quality adjustment section 19 into image data of CMY (C: cyan, M: magenta, Y: yellow). When the full-color mode is selected, the two color process section 20 directly passes, without applying any process to the image data of RGB outputted from the image quality adjustment section 19, the image data to the color correction section 21

(i.e., not performed). When the single-color mode is selected, the two color process section 20 directly passes, without applying any process to the image data of CMY outputted from the image quality adjustment section 19, the image data to the color correction section 21.

The two color process section 20 passes the generated image data of CMY to the color correction section 21. The color correction section 21 directly passes, without applying any process to the image data of CMY outputted from the two color process section 20, the image data to the black generation and under color removal section 22. The black generation and under color removal section 22 generates image data of K (black) with respect to the image data of CMY generated by the two color process section 20 and applies a under color removal process to the image data to generate image data of C', M', Y', and K.

In the color material usage estimation and calculation step of step b2-b, the color material usage estimation and calculation section 27 calculates, based on the image data of C', M', Y', and K generated by the black generation and under color removal section 22, a usage of color materials used when a two-color image is outputted by the image output apparatus 4 and generates information concerning the usage of color materials based on a result of the calculation. The usage of color materials calculated by the color material usage estimation and calculation section 27 is a total value of density values of C', M', Y', and K planes in the image data of C', M', Y', and K. It is possible to accurately calculate the usage of color materials by setting the total value of the density values of the C', M', Y', and K planes as the usage of color materials.

Information concerning the usage of color materials generated by the color material usage estimation and calculation section 27 is a ratio of a second usage, which is a usage of color materials used when a two-color image is outputted by the image output apparatus 4, to a first usage, which is a usage of color materials used when a full-color image is outputted by the image output apparatus 4.

The image processing apparatus 3 calculates the first usage as explained below. The image processing apparatus 3 sends the image data of RGB inputted from the image input apparatus 2 to the A/D conversion section 10, the shading correction section 11, the input process section 12, the document type automatic discrimination section 13, the segmentation process section 14, the compression section 17, the decompression section 18, and the image quality adjustment section 19 in this order and passes the image data of RGB outputted from the image quality adjustment section 19 to the two color process section 20. The two color process section 20 directly passes, without applying any process to the image data of RGB outputted from the image quality adjustment section 19, the image data to the color correction section 21. The color correction section 21 generates image data of CMY based on the image data of RGB. The black generation and under color removal section 22 applies a black generation and under color removal process to the image data of CMY and generates image data of C', M', Y', and K. The color material usage estimation and calculation section 27 calculates the first usage based on the image data of C', M', Y', and K generated by the black generation and under color removal section 22.

In this embodiment, the color material usage estimation and calculation section 27 generates a ratio of the second usage to the first usage (a color-material-usage ratio) as information concerning the usage of color materials. However, the color material usage estimation and calculation section 27 may generate a difference between the first usage and the second usage as numerical value information or may generate the first usage and the second usage as graph (pie graph, bar graph, etc.) information.

The color material usage estimation and calculation section 27 outputs the information concerning the usage of color materials generated in this way to the image display device 5. The image display device 5 displays the input information concerning the usage of color materials.

In a preview image data generation step of step b3, the preview image data generation section generates image data for preview that the preview image data generation section causes the image display device 5 to display. In this embodiment, the preview image data generation section includes the A/D conversion section 10, the shading correction section 11, the input process section 12, the document type automatic discrimination section 13, the segmentation process section 14, the segmentation class signal compression section 15, the segmentation class signal decompression section 16, the compression section 17, the decompression section 18, the image quality adjustment section 19, the two color process section 20, the color correction section 21, the black generation and under color removal section 22, the spatial filter section 23, the zoom process section 24, the output tone correction section 25, and the halftone generation section 26.

FIG. 3 is a diagram for explaining processes performed when the image forming apparatus 1 displays a preview. A preview display operation performed by the image processing apparatus 3 when the copier mode and the two-color mode are designated is explained with reference to FIG. 3.

During preview display, in the image processing apparatus 3, processes by the A/D conversion section 10, the shading correction section 11, the input process section 12, the document type automatic discrimination section 13, the segmentation process section 14, the compression section 17, the segmentation class signal compression section 15, the decompression section 18, the image quality adjustment section 19, and the two color process section 20 are the same as the processes for generating information concerning the usage of color materials. Therefore, explanation thereof is omitted below.

As shown in FIG. 3, during the preview display, the segmentation class signal decompression section 16 passes a decoded segmentation class signal to the spatial filter section 23 and the output tone correction section 25. During the preview display in the two-color mode, the color correction section 21 performs a process for converting the image data of CMY outputted from the two color process section 20 into image data of R'G'B'. In other words, the color correction section 21 performs a process for converting image data of CMY adapted to a printing characteristic of print processing into image data of R'G'B' adapted to a display characteristic of the image display device 5. The process for converting the image data of CMY into the image data of R'G'B' is realized by creating an LOT (lookup table) in which input values (CMY) and output values (R'G'B') are associated with each other and looking up the output values from the created LOT.

During the preview display, the black generation and under color removal section 22 directly passes, without applying any process to the image data of R'G'B' outputted from the color correction section 21, the image data to the spatial filter section 23 at the later stage. During the preview display, the spatial filter section 23 applies, based on the segmentation class signal, a spatial filter process (edge enhancement process, smoothing process, etc.) by a digital filter to the image data of R'G'B' outputted from the black generation and under color removal section 22. In other words, in the same manner as during the print process, the spatial filter section 23 executes different image processing for each of image areas based on the segmentation class signal.

During the preview display, the zoom process section 24 performs a down-sampling process for converting the number of pixels of an image formed by the image data of R'G'B' outputted from the spatial filter section 23 into the number of pixels of the image display device 5 (a process for reducing the number of pixels). The image display device 5 included in the operation panel of the image forming apparatus 1 is usually an extremely small display having low resolution compared with the resolution of image data to be printed. Therefore, during the preview display, the image data needs to be down-sampled during the preview display. The zoom process section 24 applies an image expansion and reduction process based on a magnification command (information indicating display magnification, e.g., fixed magnification such as 2 to 4 times) inputted from the operation panel included in the image forming apparatus 1.

During the preview display, the output tone correction section 25 applies, based on the segmentation class signal, an output γ correction process to the image data of R'G'B' outputted from the zoom process section 24. More specifically, the output tone correction section 25 selects, based on the segmentation class signal, a gamma curve different according to the image areas and varies content of the output γ correction process for each of the image areas. For example, a gamma curve corresponding to the display characteristic of the image display device 5 is selected for an area other than a text. A gamma curve for clearly displaying the text is selected for a text area.

Figure 4A:
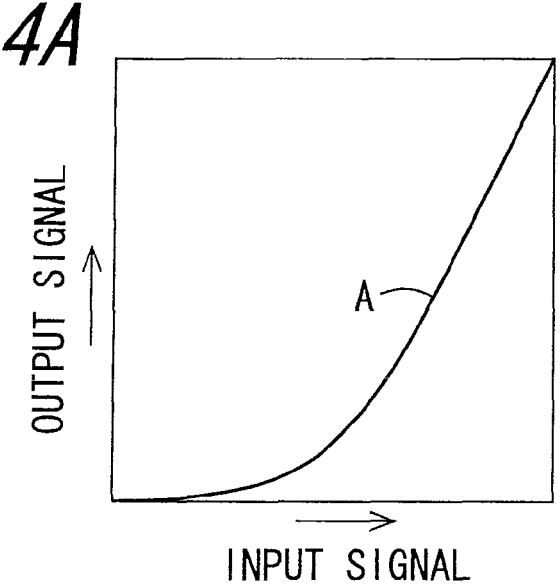
FIGS. 4A and 4B are graphs of examples of gamma curves used by the output tone correction section.
Figure 4B:
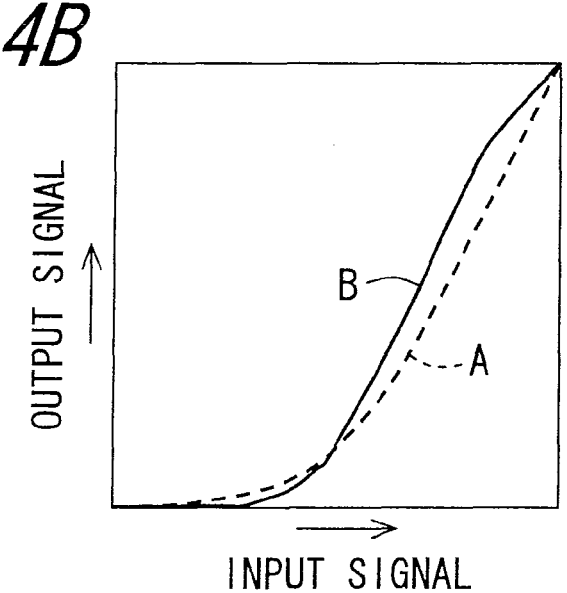

FIGS. 4A and 4B are graphs of examples of gamma curves used by the output tone correction section 25. FIG. 4A is a graph of a gamma curve corresponding to the display characteristic of the image display device 5. A curve indicated by a solid line in FIG. 4B is a gamma curve for clearly displaying a text. A curve indicated by a broken line in FIG. 4B is a gamma curve corresponding to the display characteristic of the image display device 5 and is shown for comparison with the gamma curve for clearly displaying a text. In this embodiment, the output tone correction section 25 selects a gamma curve based on the segmentation class signal. However, the output tone correction section 25 may perform output tone correction using only the gamma curve shown in FIG. 4A without selecting a gamma curve based on the segmentation class signal.

During the preview display, the halftone generation section 26 directly passes, without applying any process to the image data of R'G'B' outputted from the output tone correction section 25, the image data to the image display device 5 at the later stage. Consequently, the image display device 5 can display a preview of a copy target image based on the image data of R'G'B'.

Although the output γ correction process is executed by the output tone correction section 25, it may be executed by the image quality adjustment section 19.

In the above explanation, the process for performing preview display when the copier mode is selected is explained. However, when the image sending mode is selected, preview display may be performed by selecting signal conversion and processes according to the mode.

Order of the process for generating the information concerning the usage of color materials and the process for displaying the preview image is not specifically limited. The process of the preview display may be performed earlier than the process for generating the information concerning the usage of color materials.

Figure 5:
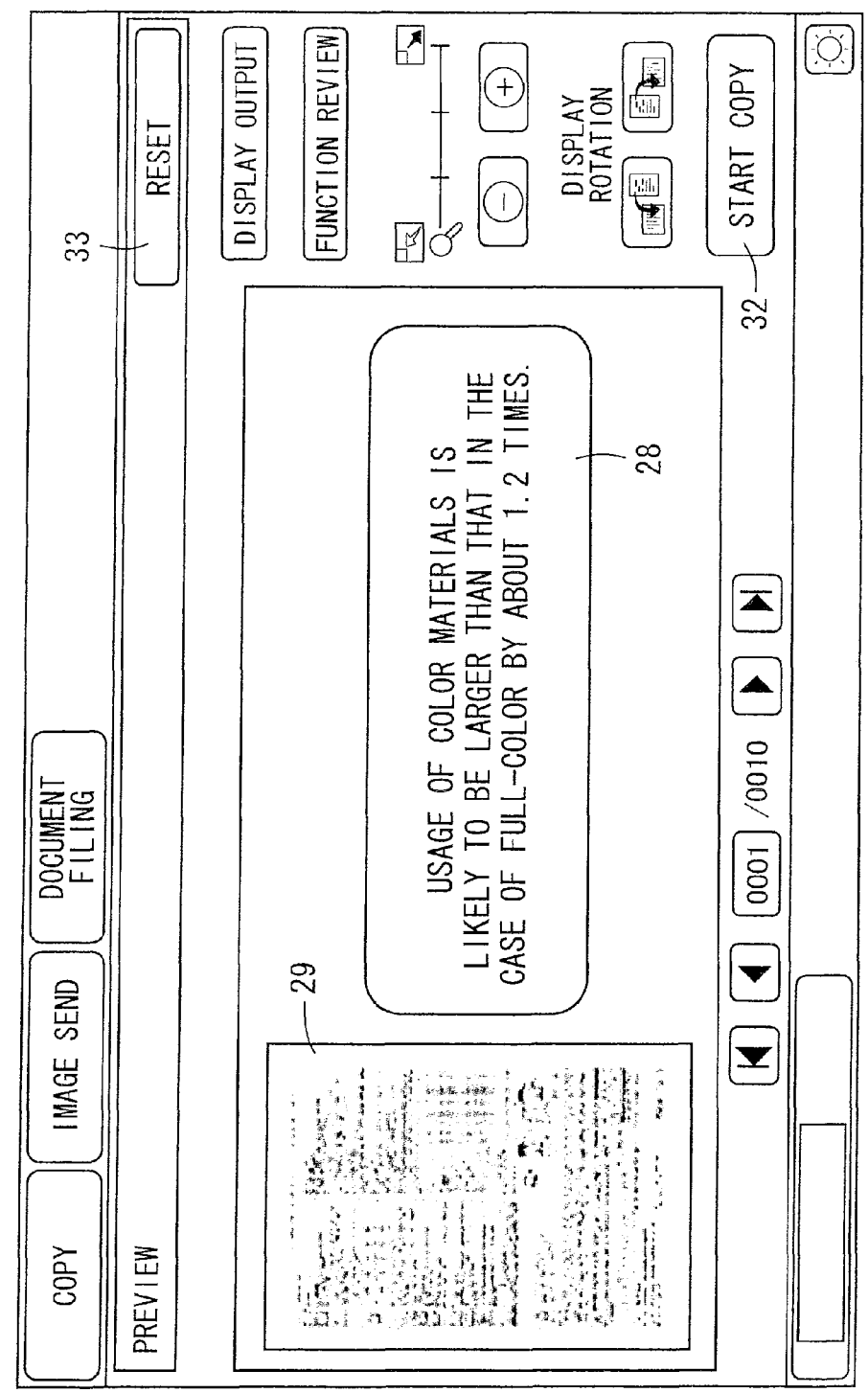
FIG. 5 is a diagram showing a preview screen.

The image display device 5 to which the information concerning the usage of color materials is inputted in step b2 and the image data for preview is inputted in step b3 displays an image shown in FIG. 5. FIG. 5 is a diagram showing a preview screen 50. The image display device 5 displays the preview screen 50 having a message 28 and a preview image 29 indicating the information concerning the usage of color materials. FIG. 5 is a diagram showing a state in which the preview image 29 and the message 28 of warning are displayed on the image display device 5. Consequently, the user can check the preview image in the two-color mode and can compare amounts of use of color materials outputted in the full-color mode and outputted in the two-color mode and check an effect of a reduction of color materials in the two-color mode.

Figure 6:
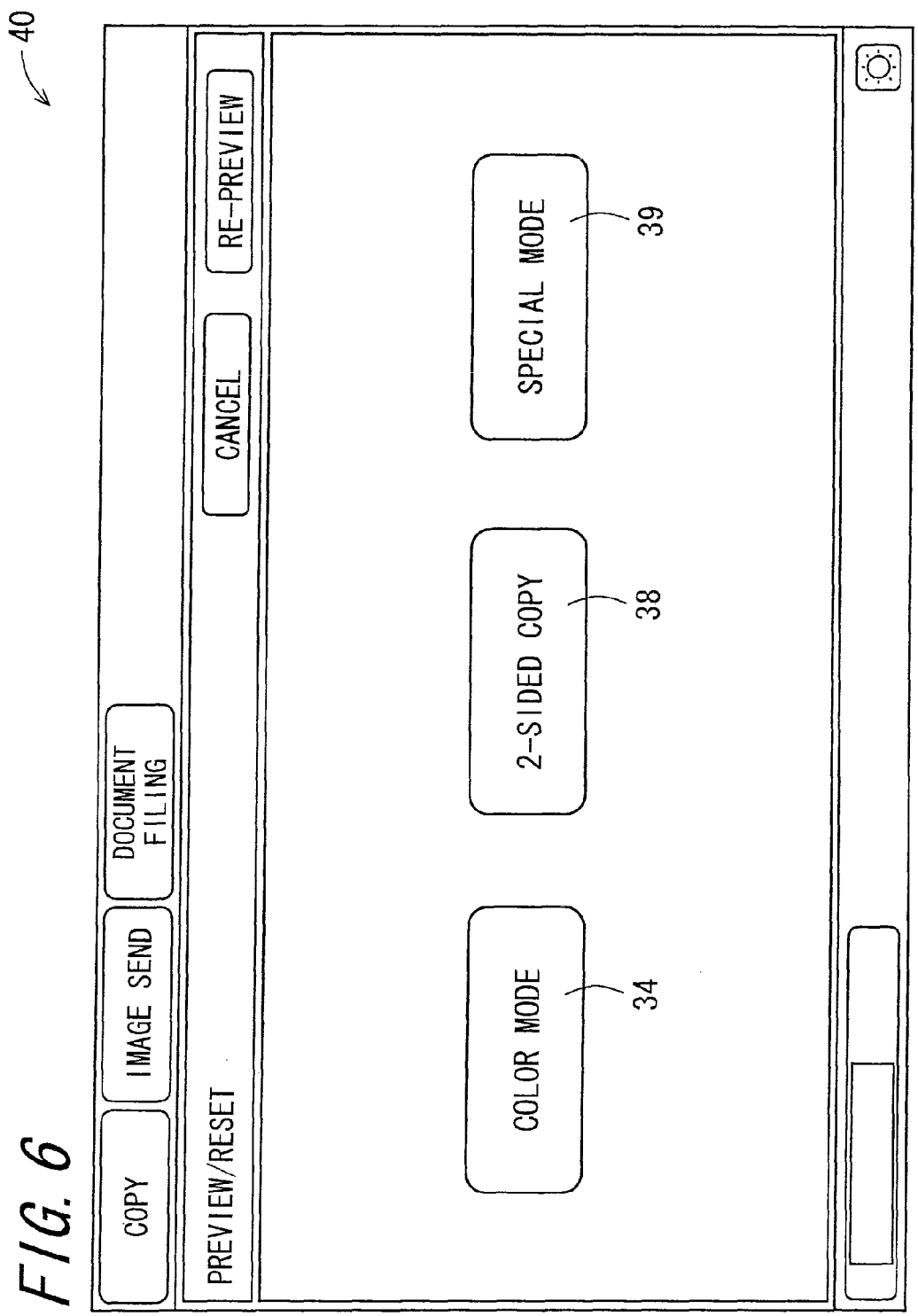
FIG. 6 is a diagram showing a screen for selecting an output form.

Thereafter, when a button indicative of "RESET" 33 is pressed by the user and a reset instruction signal is inputted in step b4, the procedure proceeds to step b5 and a screen shown in FIG. 6 is displayed on the image display device 5. FIG. 6 is a diagram showing a screen 40 for selecting an output form. On the screen 40 for selecting an output form, a button indicative of "COLOR MODE" 34, a button indicative of "2-SIDED COPY" 38, and a button indicative of "SPECIAL MODE" 39 are displayed. A special mode is selected, for example, when an image is outputted in 2 in 1 or 4 in 1 or when a date, the number of pages, a stamp, and the like are added to an output image.

When the button indicative of "COLOR MODE" 34 is not pressed by the user in step b5 and the button indicative of "2-SIDED COPY" 38 or the button indicative of "SPECIAL MODE" 39 is pressed and an instruction signal for executing a mode other than the two-color mode is inputted in step b6, the procedure proceeds to step b7 and an image output process explained later is performed. When the reset instruction signal is not inputted in step b4 and a button indicative of "START COPY" 32 shown in FIG. 5 is pressed and a two-color image output instruction signal is inputted in step b8, the procedure also proceeds to step b7 and the image output process is performed.

Figure 7:
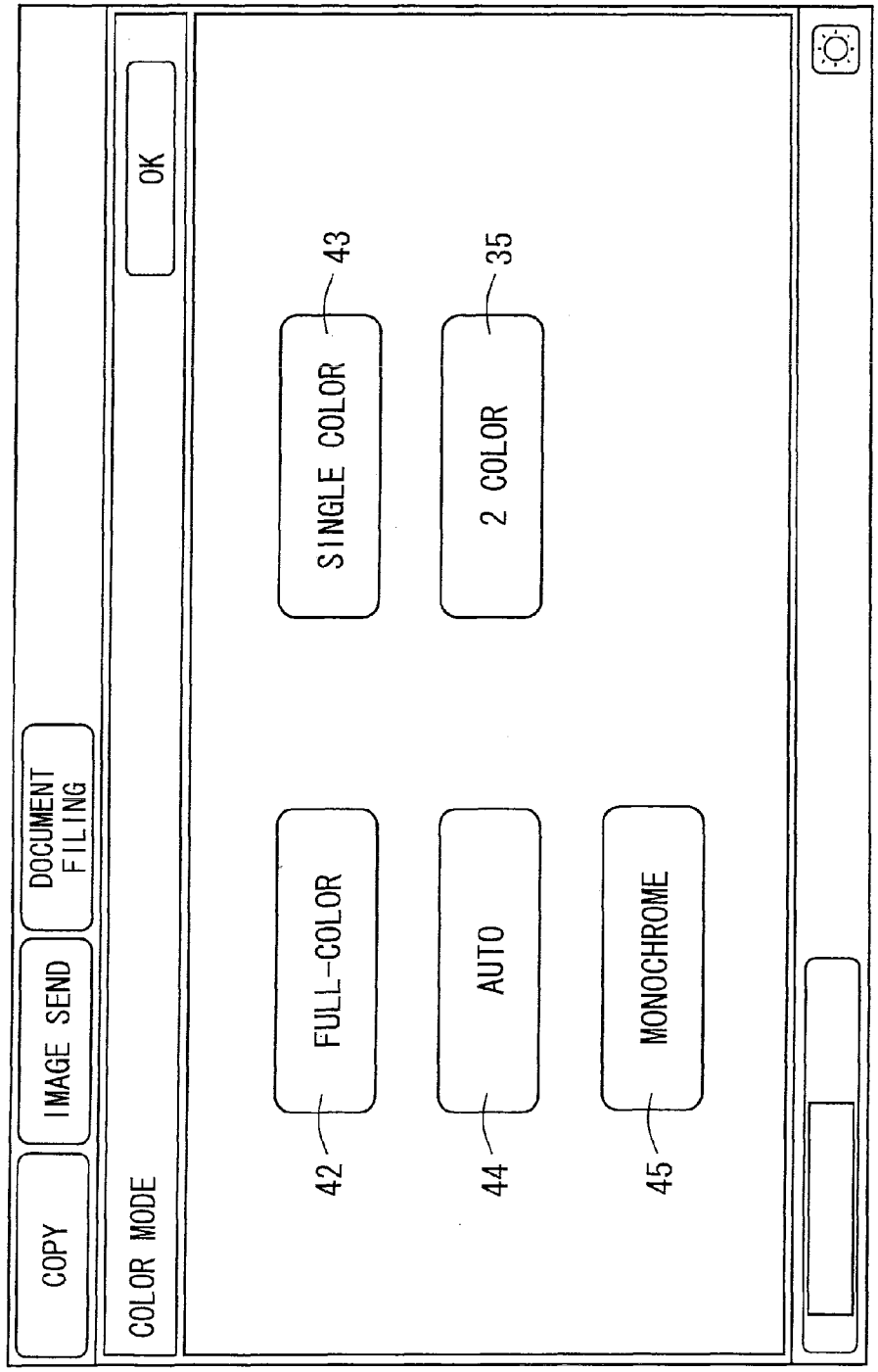
FIG. 7 is a diagram of a screen for selecting a color mode.

When the user presses the button indicative of "COLOR MODE" 34 in step b5, a screen shown in FIG. 7 is displayed. FIG. 7 is a diagram of a screen 41 for selecting the color mode. On the screen 41 for selecting the color mode, a button indicative of "FULL-COLOR" 42, a button indicative of "SINGLE COLOR" 43, a button indicative of "AUTO" 44, a button indicative of "2 COLOR" 35, and a button indicative of "MONOCHROME" 45 are displayed. When the button indicative of "FULL-COLOR" 42, the button indicative of "SINGLE COLOR" 43, the button indicative of "AUTO" 44, or the button indicative of "MONOCHROME" 45 is pressed and an instruction signal for executing a mode other than the two-color mode is inputted, the procedure proceeds to step b7 and the image output process is performed. When the button indicative of "2 COLOR" 35 is pressed and an instruction signal for executing the two-color mode is inputted, the procedure proceeds to step b9 and a screen shown in FIG. 8 is displayed.

Figure 8:
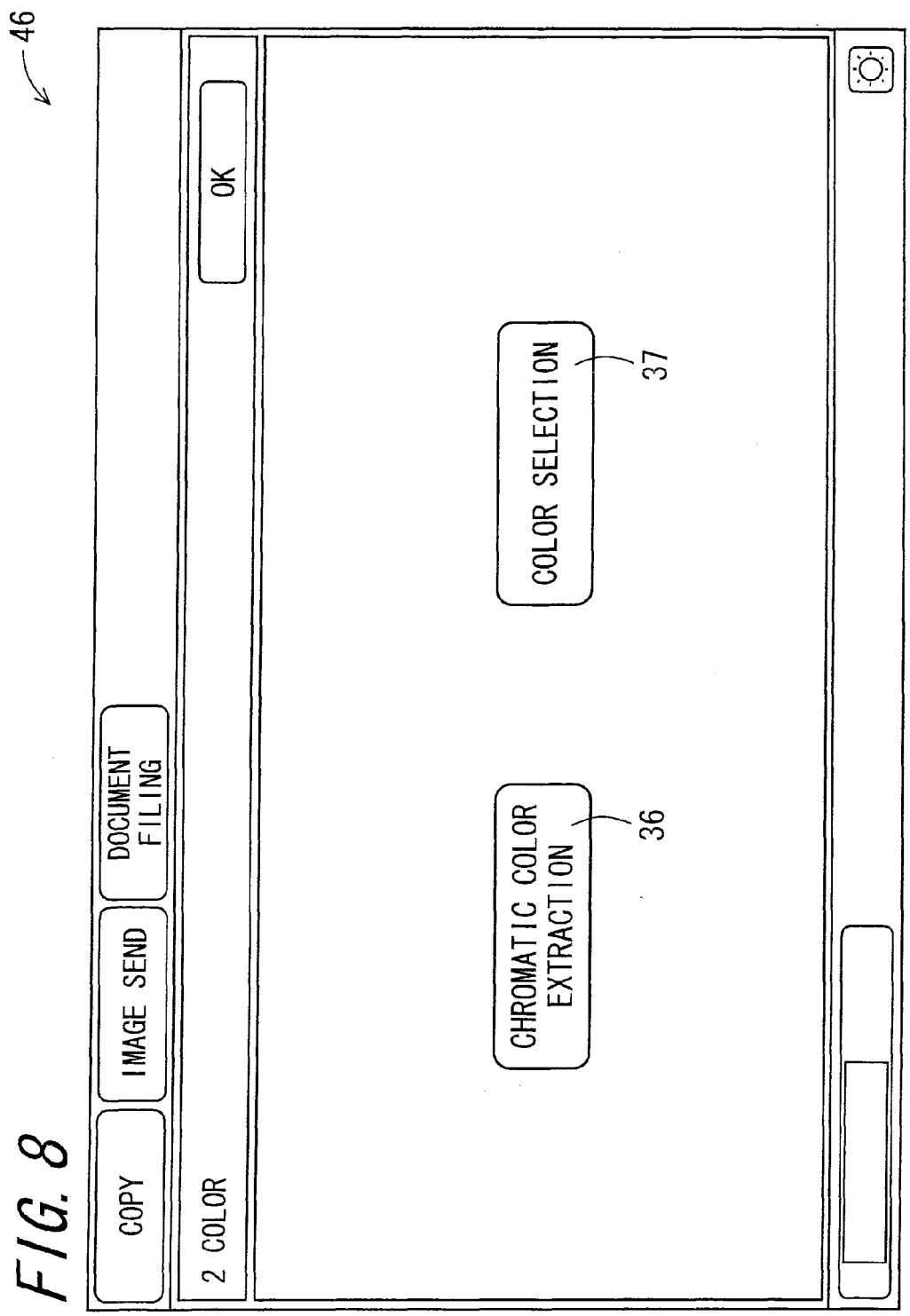
FIG. 8 is a diagram showing a screen for selecting a two-color mode.

FIG. 8 is a diagram showing a screen 46 for selecting the two-color mode. On the screen 46 for selecting the two-color mode, a button indicative of "CHROMATIC COLOR EXTRACTION" 36 and a button indicative of "COLOR SELECTION" 37 are displayed. In step b9, the button indicative of "CHROMATIC COLOR EXTRACTION" 36 or the button indicative of "COLOR SELECTION" 37 is pressed by the user and an instruction signal for the chromatic color extraction mode or the color selection mode is inputted. When the instruction signal for the chromatic color extraction mode is inputted, an instruction signal for a designated output color is inputted. When the instruction signal for the color selection mode is inputted, an instruction signal for a designated extraction color and a designated output color is inputted.

Figure 9:
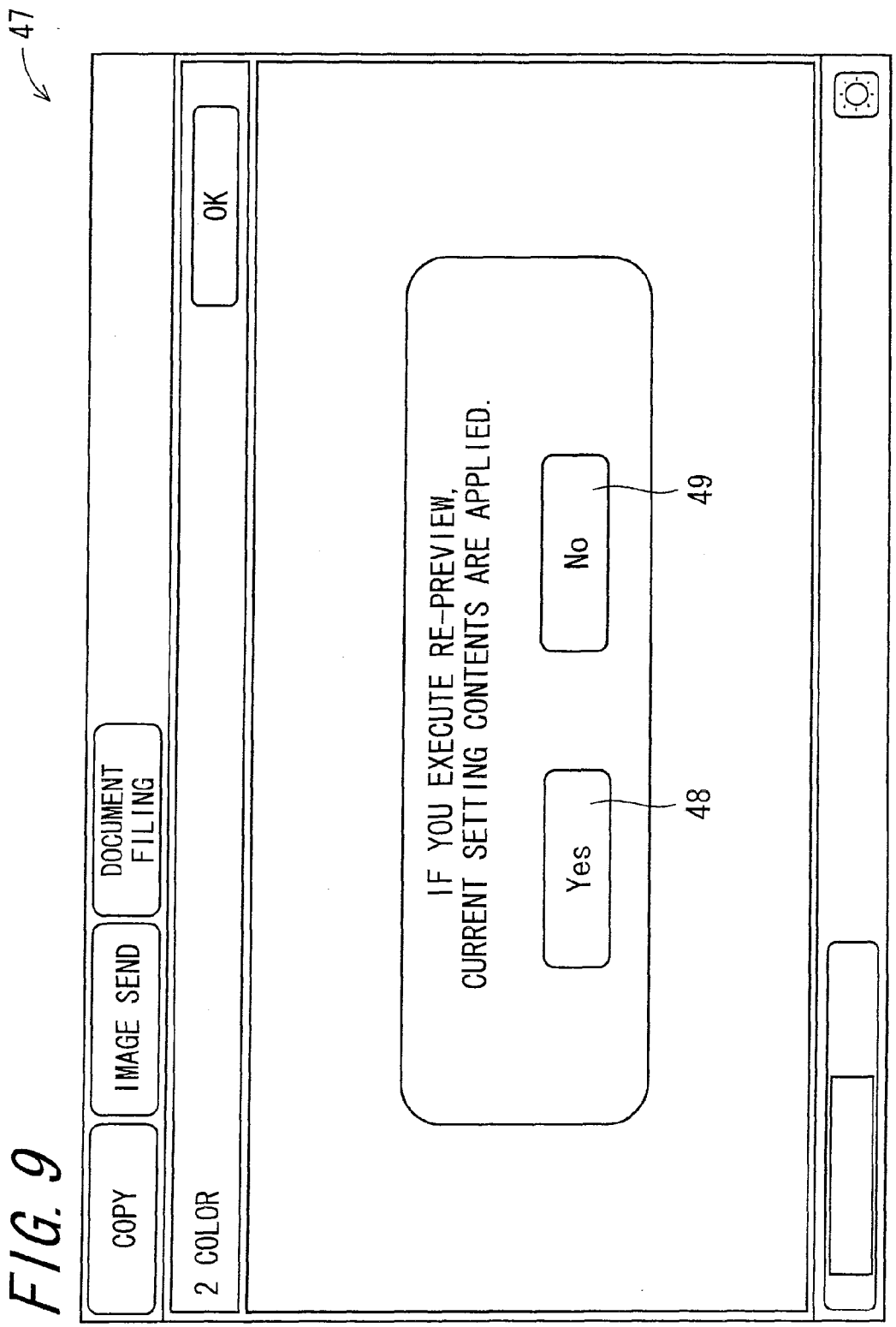
FIG. 9 is a diagram showing a screen for re-preview execution.

Thereafter, the procedure proceeds to step b10 and a screen shown in FIG. 9 is displayed. FIG. 9 is a diagram showing a screen 47 for re-preview execution. On the screen 47 for re-preview execution, a button indicative of "Yes" 48 and a button indicative of "No" 49 are displayed together with a message indicating that the current set content is applied. When the button indicative of "Yes" 48 is pressed by the user and an instruction signal for executing reset processing is inputted, the procedure proceeds to step b2-a and the two color process is performed in a new mode. When the instruction signal for executing the reset process is not inputted in step b10 and the button indicative of "No" 49 is pressed and an instruction signal for not executing the reset process is inputted in step b11, the procedure returns to step b5.

The color-material-usage ratio is displayed on the image display device 5 in this way, whereby the user can appropriately determine whether the usage of color materials can be reduced to be smaller than that used in output in the full-color mode. The user can output an image having a usage of color materials desired by the user by performing, once or plural times, operation for setting a mode again based on a value of the color-material-usage ratio.

It is likely that the usage of color materials changes according to the designated extraction color or the designated output color. Therefore, a usage of color materials used in output in a color other than the designated output color may be displayed on the preview screen 50 shown in FIG. 5 such that the user can appropriately determine a mode.

(b) Second Display Process Operation in the Image Processing Apparatus 3

Figure 10:
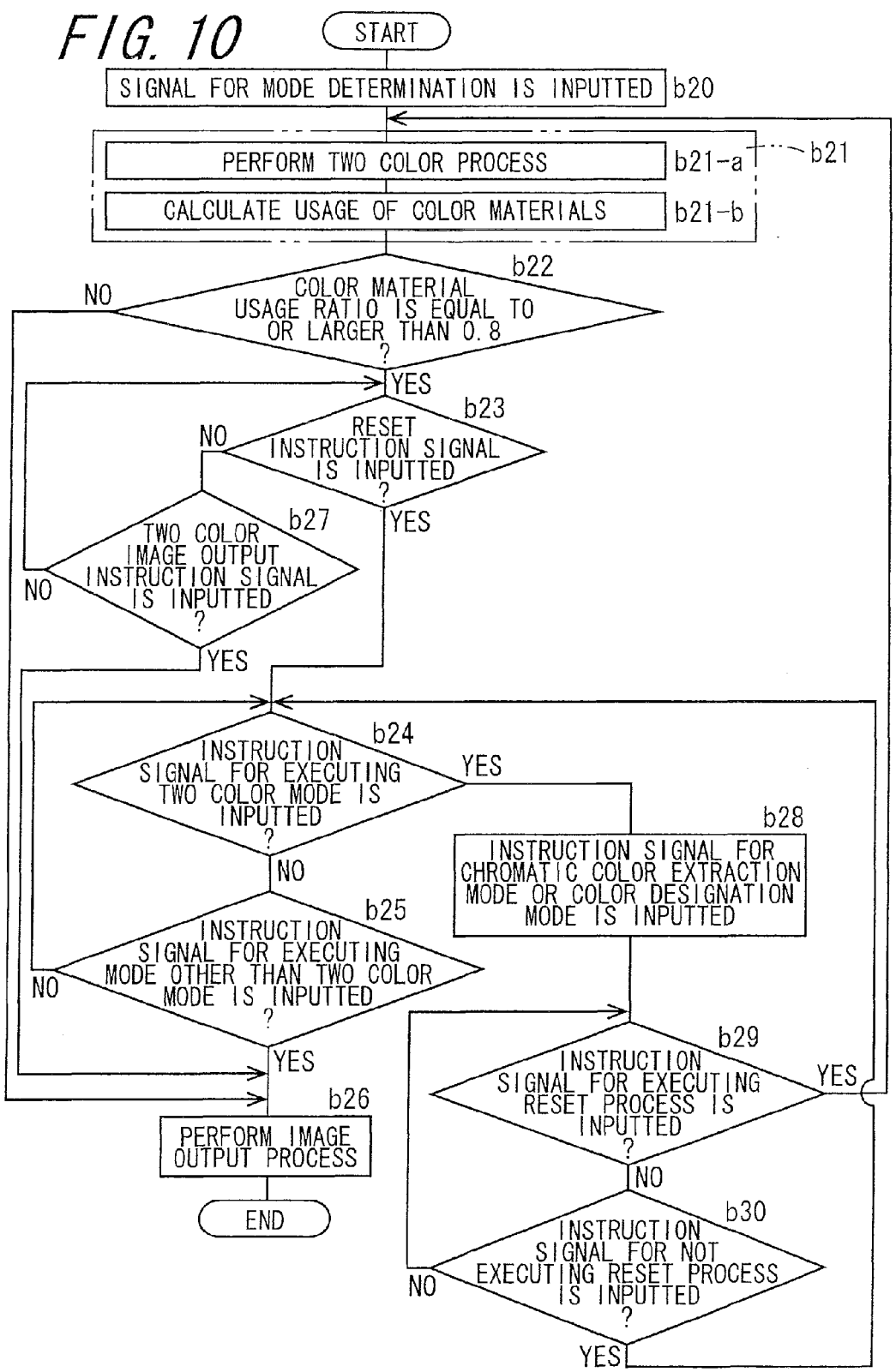
FIG. 10 is a flowchart showing a process procedure of a second display process operation in the image processing apparatus.

The second display process operation executed by the image processing apparatus 3 when the copier mode and the two-color mode are designated is explained with reference to FIG. 10. The second display process operation is the same as the process for generating information concerning the usage of color materials in the first display process operation explained with reference to FIG. 1. FIG. 10 is a flowchart showing a process procedure of the second display process operation in the image processing apparatus 3.

Since steps b20 and b21 are the same as steps b1 and b2 shown in FIG. 2, explanation of steps b20 and b21 is omitted. When a color-material-usage ratio, which is information concerning the usage of color materials, is equal to or larger than a predetermined threshold (e.g., 0.8), the image processing apparatus 3 determines that a color material reduction effect in the two-color mode is small and the procedure proceeds to step b23. When the color-material-usage ratio is smaller than the predetermined threshold, the image processing apparatus 3 determines that the color material reduction effect in the two-color mode is sufficiently shown and the procedure proceeds to step b26. Steps b23 to b30 are the same as steps b4 to b11 shown in FIG. 2. Specifically, in the second display process operation, the image processing apparatus 3 causes, without generating a preview image unlike the first display process operation, the image display device 5 to display the information concerning the usage of color materials. The image processing apparatus 3 displays the information concerning the usage of color materials on the image display device 5 only when the color material reduction effect in the two-color mode is small. When the color material reduction effect in the two-color mode is sufficiently shown, the image processing apparatus 3 performs the image output process in a mode currently set.

(c) Third Display Process Operation in the Image Processing Apparatus 3

Figure 11:
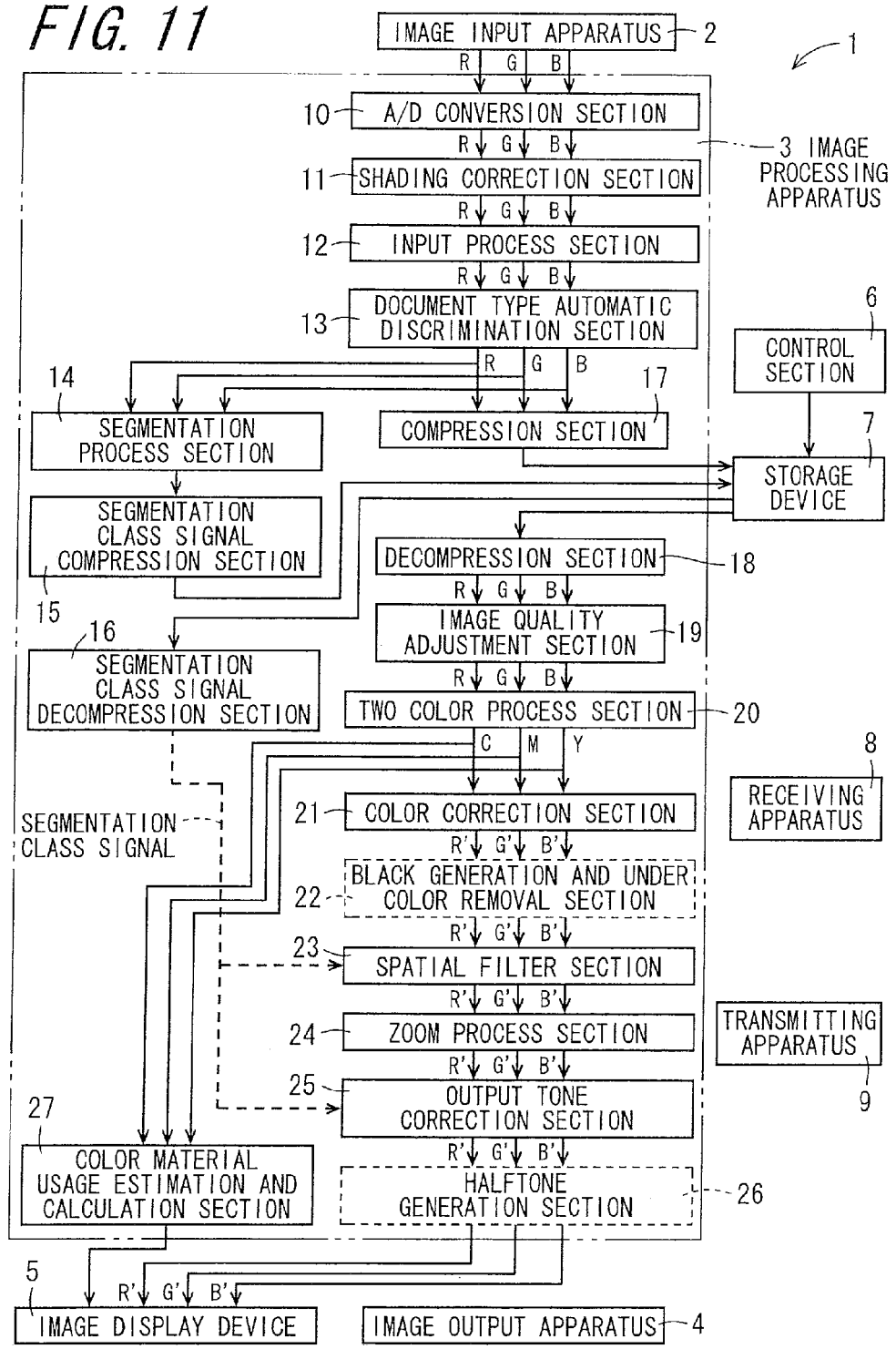
FIG. 11 is a diagram for explaining processes performed when the image processing apparatus generates information concerning the usage of color materials simultaneously with image data for preview.

The third display process operation executed by the image processing apparatus 3 when the copier mode and the two-color mode are designated is explained with reference to FIG. 11. FIG. 11 is a diagram for explaining processes performed when the image processing apparatus 3 generates information concerning the usage of color materials simultaneously with image data for preview.

In the third display process operation, in the image processing apparatus 3, processes by the A/D conversion section 10, the shading correction section 11, the input process section 12, the document type automatic discrimination section 13, the segmentation process section 14, the compression section 17, the segmentation class signal compression section 15, the decompression section 18, the image quality adjustment section 19, the segmentation class signal decompression section 16, the color correction section 21, the black generation and under color removal section 22, the spatial filter section 23, the zoom process section 24, the output tone correction section 25, and the halftone generation section 26 are the same as the preview display operation of the first display process operation. Therefore, explanation thereof is omitted below.

In the third display process operation, the image data of CMY outputted from the two color process section 20 is passed to the color correction section 21 and, at the same time, passed to the color material usage estimation and calculation section 27.

A usage of color materials calculated by the color material usage estimation and calculation section 27 in the third display process operation is a total value of density values of the planes of C, M, and Y in the image data of C, M, and Y.

The information concerning the usage of color materials is generated simultaneously with the image data for preview in this way, whereby the processes performed by the A/D conversion Section 10, the shading correction section 11, the input process section 12, the document type automatic discrimination section 13, the segmentation process section 14, the compression section 17, the segmentation class signal compression section 15, the decompression section 18, the image quality adjustment section 19, and the two color process section 20 only have to be performed once. Therefore, it is possible to reduce time until the image processing apparatus 3 causes the image display device 5 to display the information concerning the usage of color materials and the image data for preview to be shorter than that in the first display process operation for separately displaying the information concerning the usage of color materials and the image data for preview.

Figure 12:
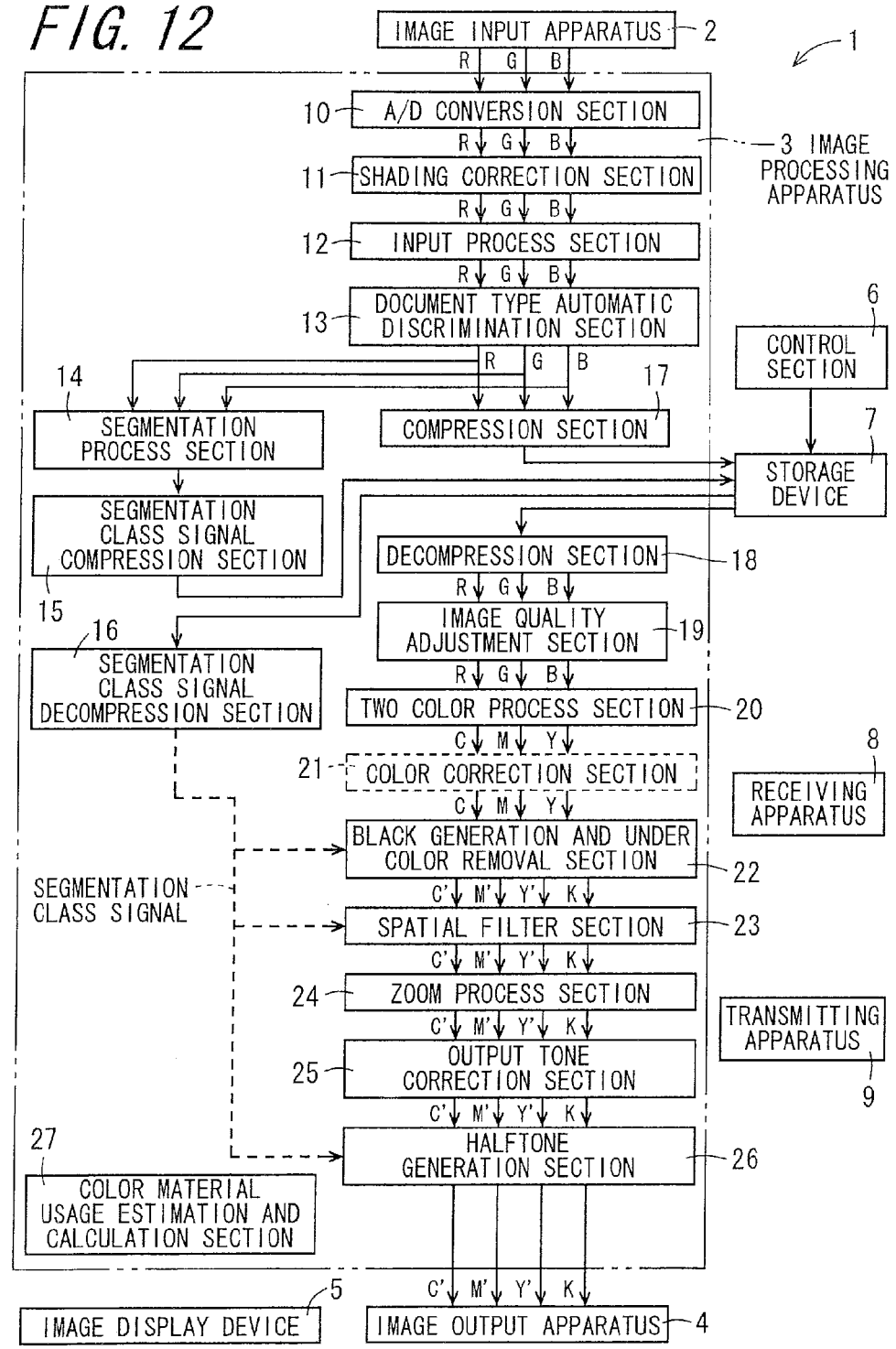
FIG. 12 is a diagram for explaining processes performed when the image forming apparatus outputs a two-color image in an image output apparatus.

(1-2) Image Processing Operation for Causing the Image Output Apparatus 4 to Output an Image An image processing operation performed by the image processing apparatus 3 when the copier mode and the two-color mode are designated is explained with reference to FIG. 12. FIG. 12 is a diagram for explaining processes performed when the image forming apparatus 1 outputs a two-color image in the image output apparatus 4.

The image processing apparatus 3 sends analog image data (RGB analog signals) of RGB (R: red, G: green, B: blue) inputted from the image input apparatus 2 to the A/D conversion section 10, the shading correction section 11, the input process section 12, the document type automatic discrimination section 13, the segmentation process section 14, and the compression section 17 in this order and temporarily stores the analog image data in the storage device 7. Thereafter, the image data read out from the storage device 7 is sent to the decompression section 18, the image quality adjustment section 19, the two color process section 20, the color correction section 21, the black generation and under color removal section 22, the spatial filter section 23, the zoom process section 24, the output tone correction section 25, and the halftone generation section 26 in this order and sent to the image output apparatus 4 as digital color signals of CMYK (C: cyan, M: magenta, Y: yellow, K: black). In the two-color mode, in the image processing apparatus 3, the process operation by the color correction section 21 is not executed and skipped.

Figure 13:
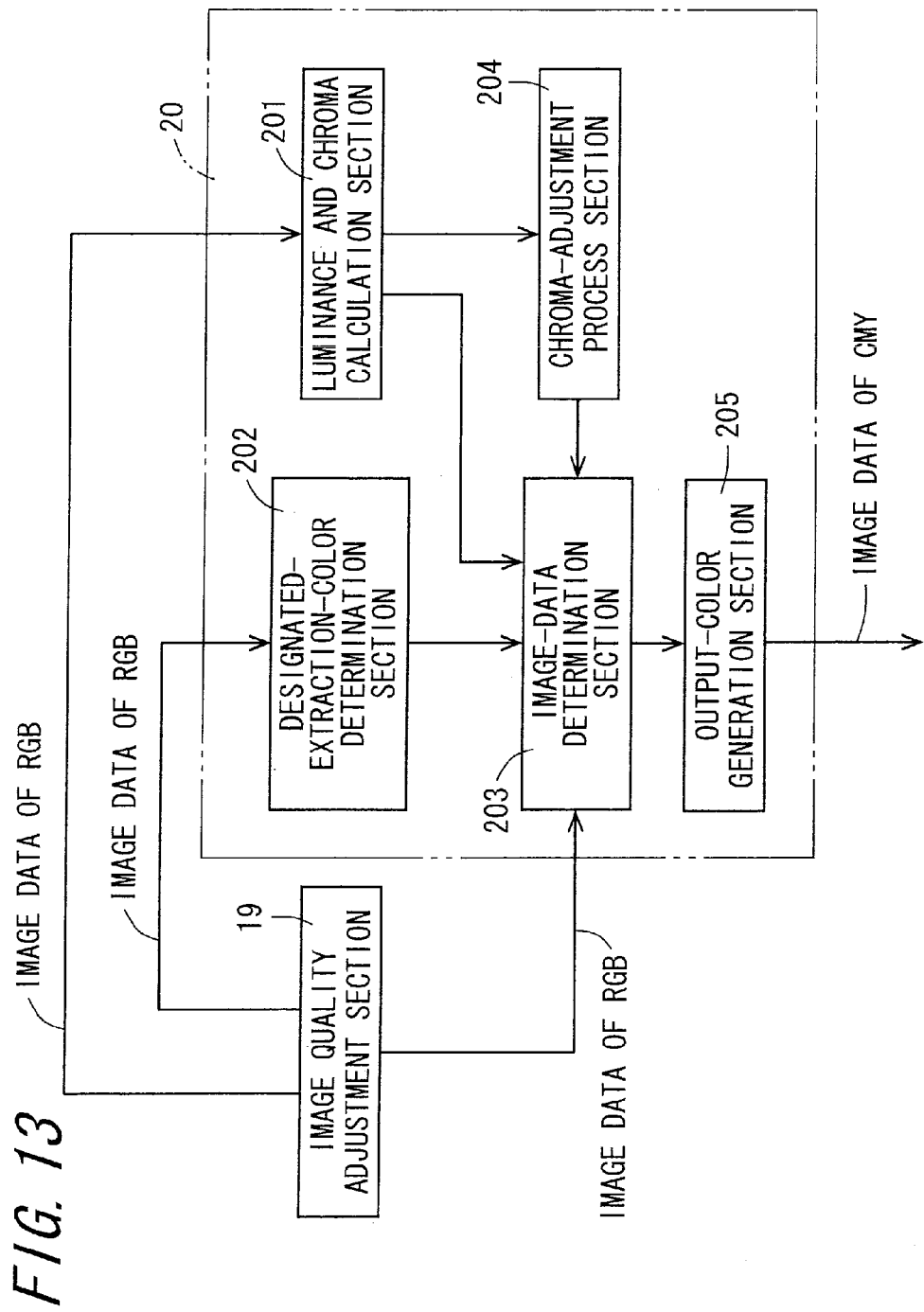
FIG. 13 is a block diagram showing the configuration of the two color process section.

FIG. 13 is a block diagram showing the configuration of the two color process section 20. The two color process section 20 converts the image data of RGB sent from the image quality adjustment section 19 into image data of CMY for outputting a two-image data formed of two colors of a chromatic color and an achromatic color. The two color process section 20 includes a luminance and chroma calculation section 201, a designated-extraction-color determination section 202, an image-data determination section 203, a chroma-adjustment process section 204, and an output-color generation section 205.

As explained above, in the two-color mode, the image forming apparatus 1 executes operation in the chromatic color extraction mode or the color selection mode based on designation by the user from the operation panel or the like. Processes by the two color process section 20 in the two-color mode are explained below separately for the chromatic color extraction mode and the color selection mode.

When the color selection mode is designated from the operation panel or the like in the image forming apparatus 1, the image processing apparatus 3 extracts a chromatic color designated in advance by the user (a designated extraction color) from an original document, outputs color belonged to the designated extraction color in a chromatic color designated by the user in advance (a designated output color), and outputs other color portions in the original document in an achromatic color (black). As each of the designated extraction color and the designated output color, desired one color is designated out of R (red), G (green), B (blue), C (cyan), M (magenta), and Y (yellow) from the operation panel or the like.

FIG. 14 is a flowchart for explaining a process procedure of processing executed by the two color process section 20 in the color selection mode. The image processing method according to the invention is executed by the image processing apparatus 3 and the two color process step in the image processing method is executed by the two color process section 20. The two color process step executed by the two color process section 20 in the color selection mode includes a luminance and chroma calculation step, a designated extraction color determination step, an image data determination step, a chroma adjustment process step, and an output-color generation step.

In the luminance and chroma calculation step of step s1, the luminance and chroma calculation section 201 calculates a luminance value and a chroma value with respect to the image data of RGB sent from the image quality adjustment section 19. The calculation of the luminance value (Lum) by the luminance and chroma calculation section 201 is performed by using the following conversion formula (1).

$$Lum = \text{Coefficient\_}R \times \text{In\_}R + \text{Coefficient\_}G \times \text{In\_}G + \text{Coefficient\_}B \times \text{In\_}B \quad (1)$$

In the conversion formula (1), In_R, In_G, and In_B respectively represent pixel values of R, G, and B planes of the RGB image data sent from the image quality adjustment section 19. Coefficient_R, Coefficient_G, and Coefficient_B in the conversion formula (1) are conversion coefficients set in advance. Coefficient_R, Coefficient_G, and Coefficient_B only have to be set in such a manner as Coefficient_R=0.3, Coefficient_G=0.6, and Coefficient_B=0.1.

The calculation of the chroma value (chroma) by the luminance and chroma calculation section 201 is performed by using the following conversion formula (2).

$$\text{Chroma} = \text{Max}(\text{In\_}R, \text{In\_}G, \text{In\_}B) - \text{Min}(\text{In\_}R, \text{In\_}G, \text{In\_}B) \quad (2)$$

In the conversion formula (2), In_R, In_G, and In_B respectively represent pixel values of the R, G, and B planes of the RGB image data sent from the image quality adjustment section 19.

In the designated extraction color determination step of step s2, the designated-extraction-color determination section 202 determines, based on comparison of a magnitude relation of the pixel values of the R, G, and B planes, whether the RGB image data sent from the image quality adjustment section 19 is input image data corresponding to a chromatic color in an original document designated by the user in advance (a designated extraction color). Specifically, the designated-extraction-color determination section 202 determines whether the RGB image data is the input image data corresponding to the designated extraction color using Table 1.

TABLE 1

| Designated extraction color | | | | | |
|---|---|---|---|---|---|
| R (red) | G (green) | B (blue) | C (cyan) | M (magenta) | Y (yellow) |
| In_R > R_JudgeR | In_R < G_JudgeR | In_R < B_JudgeR | In_R < C_JudgeR | In_R > M_JudgeR | In_R > Y_JudgeR |
| In_G < R_JudgeG | In_G > G_JudgeG | In_G < B_JudgeG | In_G > C_JudgeG | In_G < M_JudgeG | In_G > Y_JudgeG |
| In_B < R_JudgeB | In_B < G_JudgeB | In_B > B_JudgeB | In_B > C_JudgeB | In_B > M_JudgeB | In_B < Y_JudgeB |

For example, when the user designates R (red) as the designated extraction color, the designated-extraction-color determination section 202 determines, referring to a column of "R (red)" in Table 1, that the RGB image data is input image data corresponding to the designated extraction color (R: red) when In_R>R_JudgeR, In_G<R_JudgeG, and In_B<R_JudgeB are satisfied. Otherwise, the designated-extraction-color determination section 202 determines that the RGB image data is input image data not corresponding to the designated extraction color.

In_R, In_G, and In_B in Table 1 represent the pixel values of the R, G, and B planes of the RGB image data sent from the image quality adjustment section 19. R_JudgeR, R_JudgeG, and R_JudgeB in Table 1 are thresholds set in advance when the designated extraction color is R (red). G_JudgeR, G_JudgeG, and G_JudgeB are thresholds set in advance when the designated extraction color is G (green). B_JudgeR, B_JudgeG, and B_JudgeB are thresholds set in advance when the designated extraction color is B (blue). C_JudgeR, C_JudgeG, and C_JudgeB are thresholds set in advance when the designated extraction color is C (cyan). M_JudgeR, M_JudgeG, and M_JudgeB are thresholds set in advance when the designated extraction color is M (magenta). Y_JudgeR, Y_JudgeG, and Y_JudgeB are thresholds set in advance when the designated extraction color is Y (yellow). The thresholds are set as, for example, values shown in Table 2.

TABLE 2

| R_JudgeR | 200 | G_JudgeR | 40  | B_JudgeR | 40  | C_JudgeR | 40  | M_JudgeR | 200 | Y_JudgeR | 200 |
|----------|-----|----------|-----|----------|-----|----------|-----|----------|-----|----------|-----|
| R_JudgeG | 40  | G_JudgeG | 200 | B_JudgeG | 40  | C_JudgeG | 40  | M_JudgeG | 200 | Y_JudgeG | 200 |
| R_JudgeB | 40  | G_JudgeB | 40  | B_JudgeB | 200 | C_JudgeB | 200 | M_JudgeB | 200 | Y_JudgeB | 40  |

In the image-data determination step of step s3, the image-data determination section 203 determines, based on the chroma value calculated by the luminance and chroma calculation section 201 and a result of the determination by the designated-extraction-color determination section 202, whether the RGB image data sent from the image quality adjustment section 19 is first input image data or second input image data.

Specifically, when the chroma value of the RGB input image data calculated by the luminance and chroma calculation section 201 is equal to or larger than a predetermined threshold (e.g., 20) and the RGB input image data is determined as corresponding to the designated extraction color by the designated-extraction-color determination section 202, the image-data determination section 203 determines the RGB input image data as the first input image data forming a chromatic color in a two-color image. When the RGB input image data is other than the first input image data, i.e., the RGB input image data satisfies at least one of a condition that the chroma value calculated by the luminance and chroma calculation section 201 is smaller than the predetermined threshold (e.g., 20) and a condition that the RGB input image data is determined as not corresponding to the designated extraction color by the designated-extraction-color determination section 202, the image-data determination section 203 determines that the RGB input image data is the second input image data forming an achromatic color in the two-color image.

In the chroma-adjustment process step of step s4, the chroma-adjustment process section 204 adjusts the chroma value to increase chroma for the RGB input image data determined as the first input image data by the image-data determination section 203. Specifically, the chroma-adjustment process section 204 applies a chroma adjustment process to the first input image data using the following conversion formula (3). The chroma-adjustment process section 204 does not apply the chroma adjustment process to the second input image data.

$$\text{Out\_Chroma} = \text{Coefficient\_Int} \times \text{In\_Chroma} \quad (3)$$

Out_Chroma in the conversion formula (3) represents a chroma value after the chroma adjustment process by the chroma-adjustment process section 204. In_Chroma represents a chroma value calculated by the luminance and chroma calculation section 201. Coefficient_Int is a constant (e.g., 1.5) set in advance.

In the output-color generation step of step s5, the output-color generation section 205 generates image data of CMY. Specifically, as indicated by the following conversion formula (4), the output-color generation section 205 generates, with respect to the first input image data, image data of CMY based on the chroma value (Out_Chroma) after the chroma adjustment process by the chroma-adjustment process section 204 and the luminance value (Lum) calculated by the luminance and chroma calculation section 201.

$$\text{Out\_C} = 255 - Lum + \text{Out\_Chroma} \times \text{Coefficient\_Out}R$$

$$\text{Out\_M} = 255 - Lum + \text{Out\_Chroma} \times \text{Coefficient\_Out}G$$

$$\text{Out\_Y} = 255 - Lum + \text{Out\_Chroma} \times \text{Coefficient\_Out}B \quad (4)$$

Out_C, Out_M, and Out_Y in the conversion formula (4) represent density values of planes of the CMY image data generated by the output-color generation section 205. Coefficient_OutR, Coefficient_OutG, and Coefficient_OutB in the conversion formula (4) are conversion coefficients set in advance according to a designated output color designated by the user and are set based on Table 3.

TABLE 3

|  |  | Designated output color | | | | | |
|---|---|---|---|---|---|---|---|
| | Adjustment plane | R (red) | G (green) | B (blue) | C (cyan) | M (magenta) | Y (yellow) |
| R (red) | Coefficient_OutR | 0 | 1 | 1 | 1 | 0 | 0 |
| G (green) | Coefficient_OutG | 1 | 0 | 1 | 0 | 1 | 0 |
| B (blue) | Coefficient_OutB | 1 | 1 | 0 | 0 | 0 | 1 |

For example, when the user designates R (red) as the designated output color, the output-color generation section 205 refers to values of Coefficient_OutR, Coefficient_OutG, and Coefficient_OutB belonging to a column of "R (red)" in Table 3 and selects Coefficient_OutR=0, Coefficient_OutG=1, and Coefficient_OutB=1.

As indicated by the following conversion formula (5), the output-color generation section 205 generates, with respect to the second input image data, image data of CMY based on the luminance value (Lum) calculated by the luminance and chroma calculation section 201.

$$\text{Out\_C} = 255 - Lum$$

$$\text{Out\_M} = 255 - Lum$$

$$\text{Out\_Y} = 255 - Lum \quad (5)$$

Out_C, Out_M, and Out_Y in the conversion formula (5) represent density values of the planes of the CMY image data generated by the output-color generation section 205.

The two color process section 20 passes the image data of CMY generated as explained above to the color correction section 21. When the two-color mode is selected, the color correction section 21 directly passes, without applying any process to the image data of CMY outputted from the two color process section 20, the image data to the black generation and under color removal section 22.

When the two-color mode is selected, the black generation and under color removal section 22 performs black generation for generating, based on the following conversion formula (6), image data of K (black) from the image data of CMY outputted from the color correction section 21, i.e., the image data of CMY generated by the two color process section 20.

$$K=\min(C,M,Y) \quad (6)$$

When the two-color mode is selected, as indicated by the following conversion formula (7), the black generation and under color removal section 22 subtracts the image data of K (black) from the image data of CMY outputted from the color correction section 21 to generate image data of C'M'Y' that is new image data of CMY.

$$C'=C-K$$

$$M'=M-K$$

$$Y'=Y-K \quad (7)$$

As explained above, in the two-color mode, the black generation and under color removal section 22 generates the image data of K (black) with respect to the image data of CMY generated by the two color process section 20 and applies an under color removal process to the image data of CMY to generate the image data of C'M'Y'K.

Density values of the CMY image data generated by the two color process section 20 and the C'M'Y'K image data generated by the black generation and under color removal section 22 are explained with reference to FIGS. 15A to 15C.

FIGS. 15A to 15C are diagrams schematically showing density values of the planes of the image data of CMY generated by the two color process section 20 and density values of planes of the image data of C'M'Y'K generated by the black generation and under color removal section 22. FIG. 15A shows a relation between density values of CMY image data generated with respect to the first input image data by the two color process section 20 and density values of C'M'Y'K image data generated after the black generation and under color removal process by the black generation and under color removal section 22. FIG. 15B shows a relation between density values of CMY image data generated with respect to the second input image data by the two color process section 20 and density values of C'M'Y'K image data generated after the black generation and under color removal process by the black generation and under color removal section 22. FIG. 15C shows a relation between density values of CMY image data generated with respect to the first input image data in the image processing apparatus of the related art and density values of C'M'Y'K image data generated after the black generation and under color removal process by the black generation and under color removal section 22.

For example, when the designated extraction color is designated as R (red) and the designated output color is designated as R (red) in the color selection mode, as shown in FIG. 15A, the output-color generation section 205 included in the two color process section 20 of the image processing apparatus 3 generates, based on a chroma value and a luminance value, image data of CMY with respect to the first input image data forming a chromatic color (R: red) in a two-color image. A minimum of density values of C, M, and Y planes is not zero. The black generation and under color removal section 22 can generate a K (black) signal. As shown in FIG. 15B, the output-color generation section 205 generates, based on the luminance value, CMY image data having equal density values of C, M, and Y planes with respect to the second input image data forming an achromatic color in the two-color image. The black generation and under color removal section 22 generates a K (black) signal and generates C'M'Y'K image data, density values of C', M', and Y' planes of which are zero, through the black generation and under color removal process.

As explained above, in the image processing apparatus 3 according to this embodiment, the output-color generation section 205 generates, based on a chroma value and a luminance value, CMY image data, a minimum of density values of C, M, and Y planes of which is not zero, with respect to the first input image data. Therefore, it is also possible to generate a K (black) signal with respect to the first input image data forming a chromatic color in a two-color image. Therefore, the image processing apparatus 3 can reduce a so-called tone gap that is a deficiency in which a change in a color tint is conspicuous in a boundary portion between a chromatic color portion and an achromatic color portion in the two-color image.

On the other hand, since the image processing apparatus of the related art generates CMY image data with respect to the first input image data using only the chromatic value, for example, when the designated extraction color is designated as R (red) and the designated output value is designated as R (red), as shown in FIG. 15C, CMY image data, a density value of a C plane of which is zero, is generated. Therefore, when the image processing apparatus of the related art applies the black generation and under color removal process to the CMY image data generated with respect to the first input image data, a K (black) signal is not generated and a density value of a K plane is zero. Therefore, in the image processing apparatus of the related art, a large tone gap occurs between a chromatic color portion and an achromatic color portion in a two-color image.

In this embodiment, the output-color generation section 205 included in the two color process section 20 generates, based on a chroma value and a luminance value after the chroma adjustment process by the chroma-adjustment process section 204, image data of CMY with respect to the first input image data. Therefore, even when a difference in pixel values in R, G, and B planes is small among pixels of RGB input image data, it is possible to generate image data of CMY with a density difference set high. For example, when the difference in the pixel values in the R, G, and B planes tends to be read small by a scanner (e.g., a signal of a bluish or greenish color), to output an image having tone properties, the chroma adjustment process only has to be performed.

FIG. 16 is a flowchart for explaining a process procedure of processes executed by the two color process section 20 in the chromatic color extraction mode. The two color process step executed by the two color process section 20 in the chromatic color extraction mode includes a luminance and chroma calculation step, an image-data determination step, a chroma-adjustment process step, and an output-color generation step.

When the chromatic color extraction mode is designated from the operation panel or the like in the image forming apparatus 1, the image processing apparatus 3 extracts all chromatic colors in an original document, outputs all the chromatic colors in a chromatic color designated in advance by the user (a designated output color), and outputs other color portions in the original document in an achromatic color (black). As the designated output color, desired one color is designated out of R (red), G (green), B (blue), C (cyan), M (magenta), and Y (yellow) from the operation panel or the like.

In the luminance and chroma calculation step of step a1, the luminance and chroma calculation section 201 calculate a luminance value and a chroma value with respect to image data of RGB sent from the image quality adjustment section 19. The calculation of the luminance value (Lum) by the luminance and chroma calculation section 201 is performed by using the conversion formula (1). The calculation of the chroma value (Chroma) by the luminance and chroma calculation section 201 is performed by using the conversion formula (2). In the chromatic color extraction mode, the determination process by the designated-extraction-color determination section 202 is not performed.

In the image-data determination step of step a2, the image-data determination section 203 determines, based on the chroma value calculated by the luminance and chroma calculation section 201, whether the RGB image data sent from the image-quality adjustment section 19 is the first input image data or the second input image data.

Specifically, when the chroma value calculated by the luminance and chroma calculation section 201 is equal to or larger than a predetermined threshold (e.g., 20), the image-data determination section 203 determines the RGB input image data as the first input image data forming a chromatic color in a two-color image. When the RGB input image data is other than the first input image data, i.e., the chroma value calculated by the luminance and chroma calculation section 201 is smaller than the predetermined threshold (e.g., 20), the image-data determination section 203 determines that the RGB input image data is the second input image data forming an achromatic color in the two-color image.

In the chroma-adjustment process step of step a3, the chroma-adjustment process section 204 adjusts the chroma value to increase chroma for the RGB input image data determined as the first input image data by the image-data determination section 203. Specifically, the chroma-adjustment process section 204 applies a chroma adjustment process to the first input image data using the conversion formula (3). The chroma-adjustment process section 204 does not apply the chroma adjustment process to the second input image data.

In the output-color generation step of step a4, the output-color generation section 205 generates image data of CMY. Specifically, as indicated by the conversion formula (4), the output-color generation section 205 generates, with respect to the first input image data, image data of CMY based on the chroma value (Out_Chroma) after the chroma adjustment process by the chroma-adjustment process section 204 and the luminance value (Lum) calculated by the luminance and chroma calculation section 201. As indicated by the conversion formula (5), the output-color generation section 205 generates, with respect to the second input image data, image data of CMY based on the luminance value (Lum) calculated by the luminance and chroma calculation section 201.

The two color process section 20 passes the image data of CMY generated as explained above to the color correction section 21. When the two-color mode is selected, the color correction section 21 directly passes, without applying any process to the image data of CMY outputted from the two color process section 20, the image data to the black generation and under color removal section 22.

In the chromatic color extraction mode, the black generation and under color removal section 22 applies a black generation and under color removal process the same as that in the color selection mode to the image data of CMY generated by the two color process section 20 to generate image data of C'M'Y'K.

In the chromatic color extraction mode, the output-color generation section 205 included in the two color process section 20 of the image processing apparatus 3 generates, based on the chroma value and the luminance value, image data of MY with respect to the first input image data forming the chromatic color in the two-color image. Therefore, a minimum of density values of C, M, and Y planes is not zero. The output-color generation section 205 can generate a K (black) signal. Therefore, the image processing apparatus 3 can reduce a tone gap between a chromatic color portion and an achromatic color portion in the two-color image.

The spatial filter section 23 applies, based on a segmentation class signal, a spatial filter process (edge enhancement process, smoothing process, etc.) by a digital filter to the image data of C'M'Y'K outputted from the black generation and under color removal section 22. In other words, the spatial filter section 23 executes, based on the segmentation class signal, different image processing for each of image areas.

The zoom process section 24 applies, based on a magnification command (information indicating the magnification of a print image) inputted by the user (the user) from the operation panel, an image expansion and reduction process to the image data of C'M'Y'K outputted from the spatial filter section 23. The output tone correction section 25 applies the output γ correction process for output to a recording material such as a recording sheet to the image data of C'M'Y'K outputted from the zoom process section 24. The halftone generation section 26 applies, using an error diffusion method or a dither method, a tone reproduction process (halftone generation process) necessary for printing an image in the image output apparatus 4 to the image data of C'M'Y'K outputted from the output tone correction section 25.

The image data of C'M'Y'K outputted from the halftone generation section 26 is passed to the image output apparatus 4. The image output apparatus 4 prints a two-color image of the image data on the recording sheet.

(2) Image Processing Operation in the Full-Color Mode and the Single-Color Mode (2-1) During Print Process (During an Image Print Job)

Figure 17A:
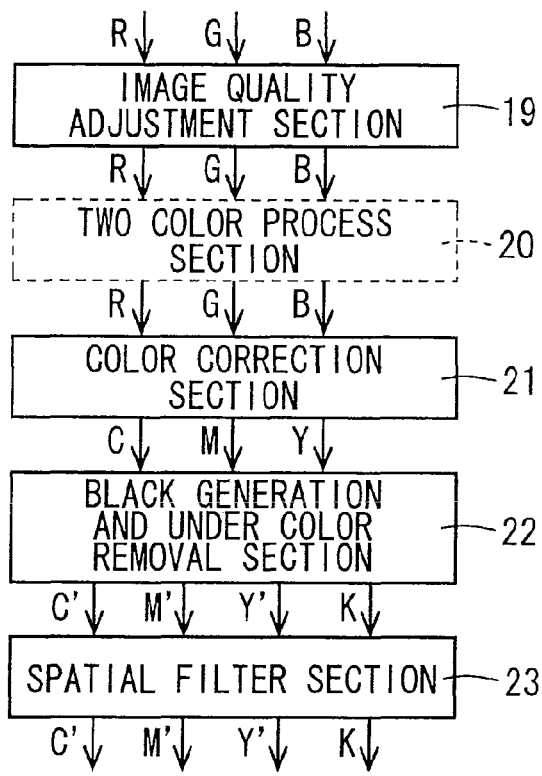
FIGS. 17A and 17B are diagrams for explaining image processing in a full-color mode and a single-color mode.
Figure 17B:
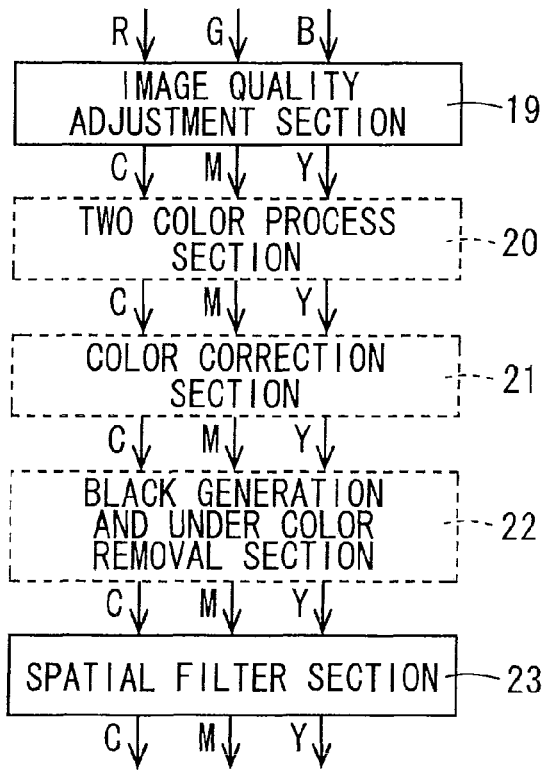

An image processing operation performed by the image processing apparatus 3 when the copier mode and the full-color mode or the copier mode and the single-color mode are designated is explained with reference to FIGS. 17A and 17B. FIGS. 17A and 17B are diagrams for explaining image processing in the full-color mode and the single-color mode. FIG. 17A is a diagram for explaining the image processing in the full-color mode. FIG. 17B is a diagram for explaining the image processing in the single-color mode. In the full-color mode and the single-color mode, in the image processing apparatus 3, processes by the A/D conversion section 10, the shading correction section 11, the input process section 12, the document type automatic discrimination section 13, the segmentation process section 14, the compression section 17, the segmentation class signal compression section 15, the decompression section 18, and the segmentation class signal decompression section 16 are the same as the processes in the two-color mode. Therefore, explanation thereof is omitted below.

First, in the full-color mode, the image quality adjustment section 19 performs detection of a page background and performs page background removal correction concerning the image data of RGB sent from the decoding section 18. The image quality adjustment section 19 performs, based on setting information inputted from the operation panel by the operator (the user), adjustment of balance of RGB (color adjustment and overall color adjustment for a tinge of red and a tinge of blue), brightness, and saturation. Image data outputted from the image quality adjustment section 19 is image data of RGB in the full-color mode.

When the full-color mode is selected, as shown in FIG. 17A, the two color process section 20 directly passes, without applying any process to the image data of RGB outputted from the image quality adjustment section 19, the image data to the color correction section 21.

When the full-color mode is selected, the color correction section 21 performs a color correction process for converting the image data of RGB outputted from the two color process section 20 into image data of CMY and applies a process for improving color reproducibility to the image data. The color correction process is realized by creating an LUT (lookup table) in which input values (RGB) and output values (CMY) are associated with each other and looking up the output values from the created LUT.

When the full-color mode is selected, the black generation and under color removal section 22 performs black generation for generating image data of K (black) from the image data of CMY outputted from the color correction section 21 and subtracts the image data of K (black) from the original image data of CMY to generate image data of C'M'Y' that is new image data of CMY. As explained above, in the full-color mode, the black generation and under color removal section 22 generates the image data of K (black) with respect to the image data of CMY generated by the color correction section 21 and applies the under color removal process to the image data of CMY to generate the image data of C'M'Y'K.

The spatial filter section 23 applies, based on a segmentation class signal, the spatial filter process (the edge enhancement process, the smoothing process, etc.) by the digital filter to the image data of C'M'Y'K outputted from the black generation and under color removal section 22. In other words, the spatial filter section 23 executes, based on the segmentation class signal, different image processing for each of image areas.

The zoom process section 24 applies, based on a magnification command (information indicating the magnification of a print image) inputted by the operator (the user) from the operation panel, an image expansion and reduction process to the image data of C'M'Y'K outputted from the spatial filter section 23. The output tone correction section 25 applies the output γ correction process for output to a recording material such as a recording sheet to the image data of C'M'Y'K outputted from the zoom process section 24. The halftone generation section 26 applies, using the error diffusion method or the dither method, the tone reproduction process (the halftone generation process) necessary for printing an image in the image output apparatus 4 to the image data of C'M'Y'K outputted from the output tone correction section 25. The image data of C'M'Y'K outputted from the halftone generation section 26 is passed to the image output apparatus 4. The image output apparatus 4 prints a full color image of the image data on the recording sheet.

The image processing operation by the image processing apparatus 3 in the single-color mode is explained with reference to FIG. 17B.

When the single-color mode is selected, the image quality adjustment section 19 performs a process for converting the image data of RGB outputted from the decoding section 18 into image data of CMY that are complementary colors of RGB. The conversion processing from the image data of RGB into the image data of CMY in the single-color mode is executed by using the following conversion formula (8).

$$\begin{pmatrix} C \\ M \\ Y \end{pmatrix} = \begin{pmatrix} r1 \cdot a1 & r1 \cdot a2 & r3 \cdot a3 \\ r2 \cdot a1 & r2 \cdot a2 & r2 \cdot a3 \\ r3 \cdot a1 & r3 \cdot a2 & r3 \cdot a3 \end{pmatrix} \times \begin{pmatrix} R \\ G \\ B \end{pmatrix} + \begin{pmatrix} r1 \cdot c \\ r2 \cdot c \\ r3 \cdot c \end{pmatrix} \qquad (8)$$

[In the formula, a1=−0.23046875, a2=−0.79296875, a3=0.0234375, and c=255.]

Conversion coefficients r1 to r3 in the conversion formula (8) are decided based on Table 4.

TABLE 4

| | | Output color (single color mode) | | | | | |
|---|---|---|---|---|---|---|---|
| Adjustment plane | | R (red) | G (green) | B (blue) | C (cyan) | M (magenta) | Y (yellow) |
| C (cyan) | r1 | 0 | 1 | 1 | 1 | 0 | 0 |
| M (magenta) | r2 | 1 | 0 | 1 | 0 | 1 | 0 |
| Y (yellow) | r3 | 1 | 1 | 0 | 0 | 0 | 1 |

For example, when the operator (the user) designates C (cyan) as a desired output color in the single-color mode, the image quality adjustment section 19 refers to values of r1 to r3 belonging to a column of "C (cyan)" in Table 4 and selects r1=1, r2=0, and r3=0. When the single-color mode is selected, an output from the image quality adjustment section 19 is image data of CMY.

Adjustment of saturation executed by the image quality adjustment section 19 can be realized by, after changing values of r1 to r3 and a1 to a3 of a matrix of the conversion formula (8), using the matrix. Therefore, concerning the adjustment of saturation and the conversion process for image data in the single-color mode (conversion from RGB to CMY), the matrix can be shared and an image processing circuit can be shared. Therefore, in this embodiment, the adjustment of saturation and the conversion process for image data in the single-color mode are performed by the same process section (the image quality adjustment section).

When the single-color mode is selected, the two color process section 20, the color correction section 21, and the black generation and under color removal section 22 directly pass, without applying any process to the image data of CMY outputted from the image quality adjustment section 19, the image data to the spatial filter section 23 as shown in FIG. 17B.

In the single-color mode, the spatial filter section 23 applies, based on a segmentation class signal, the spatial filter process (the edge enhancement process, the smoothing process, etc.) by the digital filter to the image data of CMY outputted from the black generation and under color removal section 22. In other words, the spatial filter section 23 executes, based on the segmentation class signal, different image processing for each of image areas.

The zoom process section 24 applies, based on a magnification command (information indicating the magnification of a print image) inputted by the operator (the user) from the operation panel, an image expansion and reduction process to the image data of CMY outputted from the spatial filter section 23. The output tone correction section 25 applies the output γ correction process for output to a recording material such as a recording sheet to the image data of CMY outputted from the zoom process section 24. The halftone generation section 26 applies, using the error diffusion method or the dither method, the tone reproduction process (the halftone generation process) necessary for printing an image in the image output apparatus 4 to the image data of CMY outputted from the output tone correction section 25. The image data of CMY outputted from the halftone generation section 26 is passed to the image output apparatus 4. The image output apparatus 4 prints a single-color image of the image data on the recording sheet.

(2-2) During Preview Display

Figure 18A:
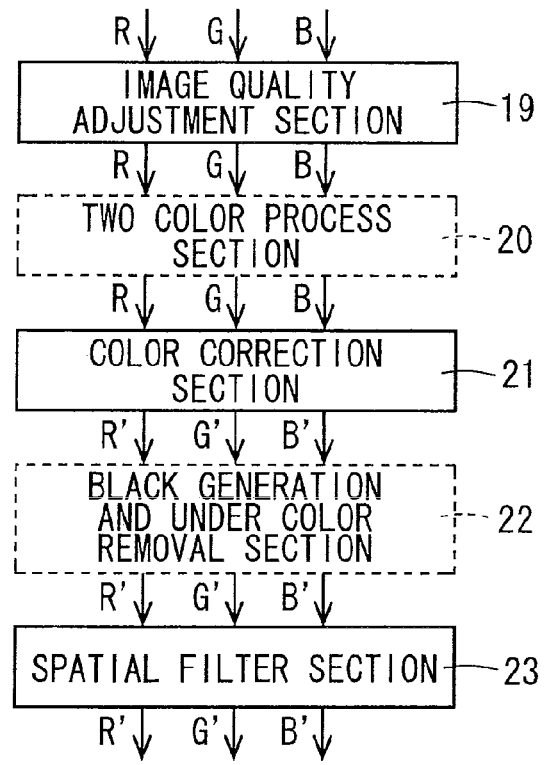
FIGS. 18A and 18B are diagrams for explaining processes in performing preview display in the full-color mode and the single-color mode.
Figure 18B:
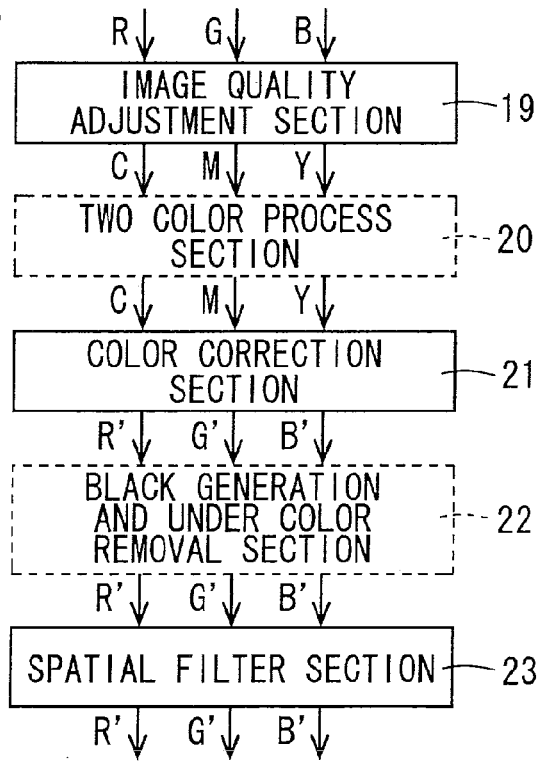

A preview display operation performed by the image processing apparatus 3 when the copier mode and the full-color mode or the copier mode and the single-color mode are designated is explained with reference to FIGS. 18A and 18B. FIGS. 18A and 18B are diagrams for explaining processes in performing preview display in the full-color mode and the single-color mode. FIG. 18A is a diagram for explaining processes in the full-color mode. FIG. 18B is a diagram for explaining processes in the single-color mode. In the full-color mode and the single-color mode, in the image processing apparatus 3, processes by the A/D conversion section 10, the shading correction section 11, the input process section 12, the document type automatic discrimination section 13, the segmentation process section 14, the compression section 17, the segmentation class signal compression section 15, the decompression section 18, and the segmentation class signal decompression section 16 are the same as the processes in the two-color mode. Therefore, explanation thereof is omitted below.

First, in the full-color mode, the image quality adjustment section 19 performs detection of a page background and performs page background removal correction concerning the image data of RGB sent from the decompression section 18. The image quality adjustment section 19 performs, based on setting information inputted from the operation panel by the operator (the user), adjustment of balance of RGB (color adjustment and overall color adjustment for a tinge of red and a tinge of blue), brightness, and saturation. Image data outputted from the image quality adjustment section 19 is image data of RGB in the full-color mode.

When the full-color mode is selected, as shown in FIG. 18A, the two color process section 20 directly passes, without applying any process to the image data of RGB outputted from the image quality adjustment section 19, the image data to the color correction section 21.

During preview display in the full-color mode, the color correction section 21 performs a process for converting the image data of RGB outputted from the two color process section 20 into image data of R'G'B'. The image data of RGB inputted to the color correction section 21 is data adapted to a color space of the image input apparatus 2 (the scanner). The color correction section 21 performs a process for converting the image data of RGB into image data of R'G'B' adapted to a color space of the image display device 5.

In other words, the color correction section 21 performs a process for converting image data of RGB adapted to an image reading characteristic of the image input apparatus 2 into image data of R'G'B' adapted to the display characteristic of the image display device 5. The process for converting the image data of RGB into the image data of R'G'B' is realized by creating an LUT in which input values (RGB) and output values (R'G'B') are associated with each other and looking up the output values from the created LUT. In this embodiment, in the full-color mode, the image processing circuit is shared in the conversion process from the image data of RGB into the image data of CMYK during the print process and the conversion process from the image data of RGB into the image data of R'G'B' during the preview display.

The black generation and under color removal section 22 directly passes, without applying any process to the image data of R'G'B' outputted from the color correction section 21, the image data to the spatial filter section 23 at the later stage. During the preview display, the spatial filter section 23 applies, based on a segmentation class signal, the spatial filter process (the edge enhancement process, the smoothing process, etc.) by the digital filter to the image data of R'G'B' outputted from the black generation and under color removal section 22. In other words, in the same manner as during the print process, the spatial filter section 23 executes different image processing for each of image areas based on the segmentation class signal.

Processes by the zoom process section 24, the output tone correction section 25, and the halftone generation section 26 at the later stage than the spatial filter section 23 during the preview display in the full-color mode are the same as the processes during the preview display in the two-color mode. Therefore, explanation thereof is omitted.

A preview display operation by the image processing apparatus 3 in the single-color mode is explained with reference to FIG. 18B.

During the preview display in the single-color mode, in the same manner as during the print process in the single-color mode, the image quality adjustment section 19 performs the process for converting the image data of RGB outputted from the decoding section 18 into image data of CMY that are complementary colors of RGB. When the single-color mode is selected, as shown in FIG. 18B, the two color process section 20 directly passes, without applying any process to image data of CMY outputted from the image quality adjustment section 19, the data to the color correction section 21.

During the preview display in the single-color mode, the color correction section 21 performs a process for converting the image data of CMY outputted from the two color process section 20 into image data of R'G'B'. In other words, the color correction section 21 performs a process for converting image data of CMY adapted to the printing characteristic of the print process into image data of R'G'B' adapted to the display characteristic of the image display device 5. The process for converting the image data of CMY into the image data of R'G'B' is realized by creating an LUT in which input values (CMY) and output values (R'G'B') are associated with each other and looking up the output values from the created LUT.

During the preview display, the black generation and under color removal section 22 directly passes, without applying any process to the image data of R'G'B' outputted from the color correction section 21, the image data to the spatial filter section 23 at the later stage. During the preview display, the spatial filter section 23 applies, based on a segmentation class signal, the spatial filter process (the edge enhancement process, the smoothing process, etc.) by a digital filter to the image data of R'G'B' outputted from the black generation and under color removal section 22. In other words, in the same manner as during the print process, the spatial filter section 23 executes different image processing for each of image areas based on the segmentation class signal.

Processes by the zoom process section 24, the output tone correction section 25, and the halftone generation section 26 at the later stage than the spatial filter section 23 during the preview display in the single-color mode are the same as the processes during the preview display in the two-color mode. Therefore, explanation thereof is omitted.

Figure 19:
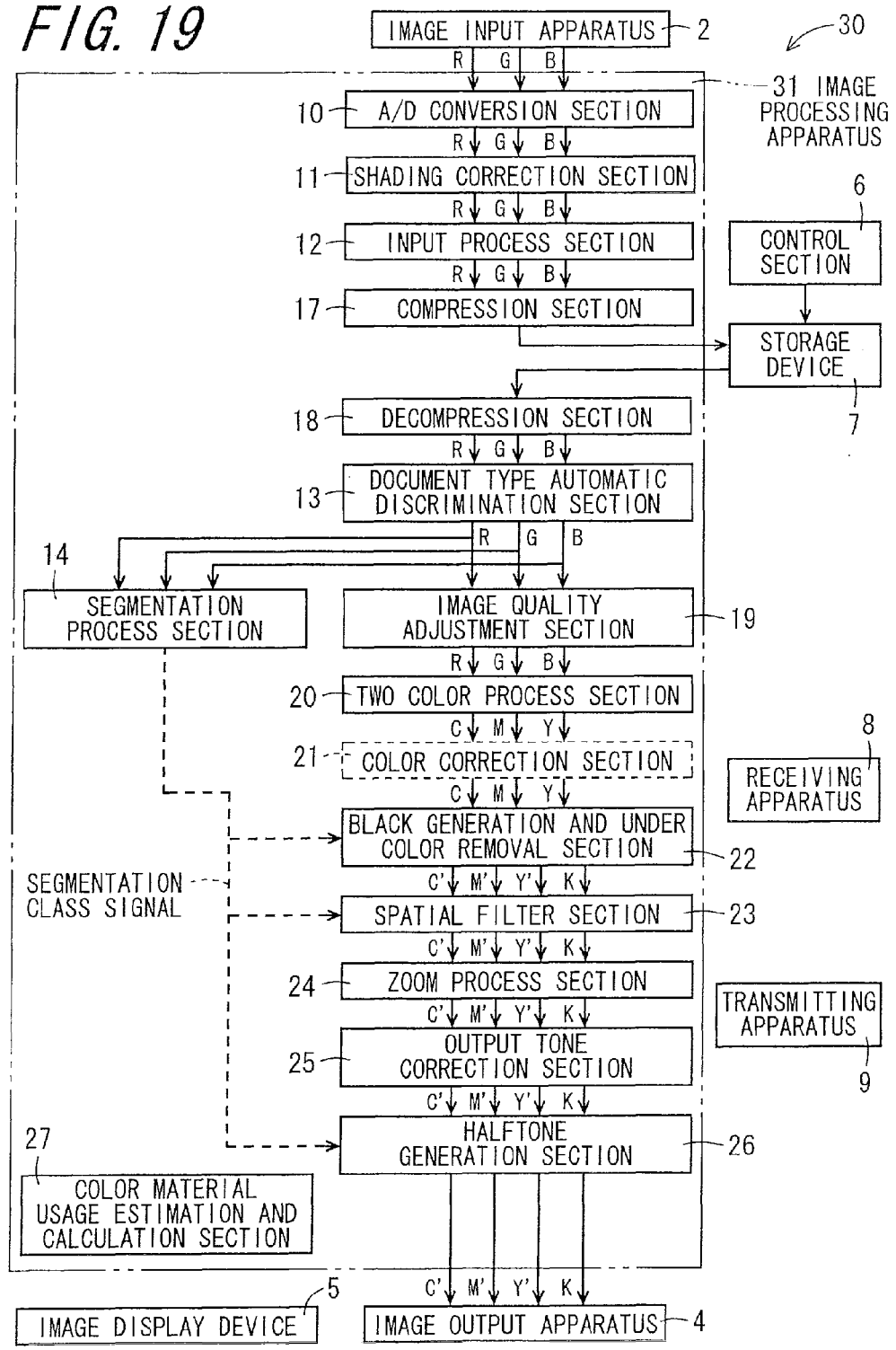
FIG. 19 is a block diagram showing the configuration of an image forming apparatus 30 according to another embodiment of the invention.

FIG. 19 is a block diagram showing the configuration of an image forming apparatus 30 according to another embodiment of the invention. The image forming apparatus 30 is similar to the image forming apparatus 1. Components corresponding to those of the image forming apparatus 1 are denoted by the same reference numerals and signs, and explanation thereof is omitted. The image forming apparatus 30 includes an image processing apparatus 31 instead of the image processing apparatus 3 included in the image forming apparatus 1.

Before applying a segmentation process and a document type discrimination process to analog image data of RGB sent from the image input apparatus 2, the image processing apparatus 31 included in the image forming apparatus 30 encodes image data of RGB and temporarily stores the encoded image data of RGB in the storage device 7. The image processing apparatus 31 reads out the encoded image data from the storage device 7, decodes the encoded image data, and applies the document type discrimination process by the document type automatic discrimination section 13 and the segmentation process by the segmentation process section 14 to the decoded image data.

As still another embodiment of the invention, in order to cause a computer to function as the image processing apparatus 3, it is also possible to provide a program code to be executed by the computer (any one of an execution format program, an intermediate code program, and a source program) and a computer-readable recording medium having the program code recorded thereon. According to this embodiment, it is possible to portably provide a recording medium having recorded thereon a program code for performing the image processing method explained above.

Note that, as the recording medium, in order to perform processes by a microcomputer, a memory which is not shown, e.g., a ROM (Read Only Memory), itself may serve as a program medium, or alternatively, a program reading apparatus, although not shown, may be provided as an external storage apparatus and by inserting the recording medium thereinto, the apparatus may serve as a readable program medium.

In any case, a stored program code may be executed by a microprocessor accessing the program code, or in any case, a scheme may be employed in which a program code is read, the read program code is downloaded into a program storage area (not shown) of a microcomputer, and the program is executed. The program for download is stored in advance in a main body apparatus.

The above program medium is a recording medium configured to be separable from a main body, and may be a medium that fixedly carries a program code thereon, including a tape type, such as a magnetic tape or cassette tape, a disk type including a magnetic disk such as a floppy (registered trademark) disk or hard disk or an optical disk such as CD-ROM/MO (Magneto Optical disc)/MD (Mini disc)/DVD (Digital Versatile Disc), a card type, such as an IC (Integrated Circuit) card (including a memory card)/optical card, or a semiconductor memory such as a mask ROM, EPROM (Erasable Programmable Read Only Memory), EEPROM (Electrically Erasable Programmable Read Only Memory), or flash ROM.

Further, by having a system configuration capable of connecting a communication network including the Internet, the program medium may be a medium that carries thereon a program code such that a program code is downloaded from the communication network in a streaming manner. Note that when a program code is thus downloaded from the communication network, the program for download may be stored in advance in a main body apparatus or may be installed from another recording medium. Note also that the invention can also be implemented in the form of a computer data signal in which the above program code is embodied by electronic transmission and which is embedded in a carrier wave.

The recording medium is read by a program reading device included in a digital color image forming apparatus or a computer system, whereby the image processing method is executed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processing apparatus connected to an image display device capable of displaying an image so as to perform data communication with each other, the image processing apparatus comprising:
    a two color process section that generates, based on input image data of RGB inputted by reading an original document, image data of CMY for outputting a two-color image formed of two colors of a chromatic color and an achromatic color;
    a color material usage estimation and calculation section that calculates, based on the image data of CMY generated by the two color process section, a usage of color materials used in outputting the two-color image and generates information concerning the usage of color materials from a result of the calculation; and
    a color correction section that generates, based on the input image data of RGB, image data of CMY for outputting a full-color image,
    the color material usage estimation and calculation section outputting the generated information concerning the usage of color materials to the image display device, and
    the color material usage estimation and calculation section calculating, based on the image data of CMY generated by the color correction section, a first usage that is a usage of color materials used in outputting the full-color image, calculating, based on the image data of CMY generated by the two color process section, a second usage that is a usage of color materials used in outputting the two-color image, and generating, from results of the calculations, as information concerning a usage of color materials, information representing a comparison of the first usage and the second usage.

2. The image processing apparatus of claim 1, wherein the color material usage estimation and calculation section generates, as information concerning a usage of color materials, information representing a color-material-usage ratio that is a ratio of the second usage to the first usage and outputs, when the color-material-usage ratio is equal to or larger than a predetermined threshold, the generated information representing the color-material-usage ratio to the image display device.

3. The image processing apparatus of claim 1, comprising a preview image data generation section that generates, based on the input image data of RGB, image data for preview representing the two-color mage, wherein the preview image data generation section outputs the generated image data for preview to the image display device.

4. An image forming apparatus comprising the image processing apparatus of claim 1.

5. An image processing method executed in an image processing apparatus connected to an image display device capable of displaying an image so as to perform data communication with each other, the image processing method comprising:

a two color process step of generating, based on input image data of RGB inputted by reading an original document, image data of CMY for outputting a two-color image formed of two colors of a chromatic color and an achromatic color;

a color material usage estimation and calculation step of calculating, based on the image data of CMY generated in the two color process step, a usage of color materials used in outputting the two-color image and generating information concerning the usage of color materials from a result of the calculation; and a color correction step of generating, based on the input image data of RGB, image data of CMY for outputting a full-color image, the color-material-usage estimation and calculation step including outputting the generated information concerning the usage of color materials to the image display device, and the color material usage estimation and calculation step including calculating, based on the image data of CMY generated in the color correction step, a first usage that is a usage of color materials used in outputting the full-color image, calculating, based on the image data of CMY generated in the two color process step, a second usage that is a usage of color materials used in outputting the two-color image, and generating, from results of the calculations, as information concerning a usage of color materials, information representing a comparison of the first usage and the second usage.

6. A non-transitory computer-readable recording medium on which is recorded an image processing program for causing a computer to function as the sections of the image processing apparatus of claim 1.

* * * * *